(12) United States Patent
Lee et al.

(10) Patent No.: US 10,514,880 B2
(45) Date of Patent: *Dec. 24, 2019

(54) NFC-ENABLED APPARATUS AND METHOD OF OPERATION THEREOF

(71) Applicant: AQ CORPORATION, Suwon-si, Gyeonggi-do (KR)

(72) Inventors: Sang Hoon Lee, Suwon (KR); Jin Hwa Kim, Namyangju-si (KR)

(73) Assignee: AQ CORPORATION, Suwon-si, Gyeonggi-do (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/377,075

(22) Filed: Apr. 5, 2019

(65) Prior Publication Data

US 2019/0236587 A1 Aug. 1, 2019

Related U.S. Application Data

(63) Continuation of application No. 16/248,552, filed on Jan. 15, 2019, which is a continuation of application
(Continued)

(30) Foreign Application Priority Data

| Jan. 4, 2011 | (KR) | 10-2011-0000401 |
| Jan. 26, 2011 | (KR) | 10-2011-0007792 |
| Nov. 4, 2011 | (KR) | 10-2011-0114483 |

(51) Int. Cl.
*G06Q 20/32* (2012.01)
*G06Q 20/20* (2012.01)
(Continued)

(52) U.S. Cl.
CPC .......... *G06F 3/1454* (2013.01); *G06F 3/0416* (2013.01); *G06F 3/0482* (2013.01);
(Continued)

(58) Field of Classification Search
CPC ........................................... G06Q 10/00–50/00
(Continued)

(56) References Cited

U.S. PATENT DOCUMENTS 7,127,236 B2 10/2006 Khan et al.
7,702,739 B1 4/2010 Cheng et al.
(Continued)

FOREIGN PATENT DOCUMENTS

JP 2006-331396 A 12/2006
JP 2007-087096 A 4/2007
(Continued)

OTHER PUBLICATIONS

Berger, "SMRT Launches NFC Posters in Singapore", https://www.nfcworld.com/2011/10-18-310763/smrt-launches-nfc-posters-in-singapore—2 pages (Feb. 23, 2017).
(Continued)

*Primary Examiner* — Alan S Miller
(74) *Attorney, Agent, or Firm* — Knobbe Martens Olson & Bear LLP

(57) ABSTRACT

An NFC-enabled apparatus is disclosed. The apparatus includes a touch screen display and a near field communication (NFC) module comprising an NFC antenna and an NFC controller. In response to tagging between the NFC-enabled apparatus and the external NFC terminal, an NFC communication channel is established between the NFC-enabled apparatus and the external NFC terminal for data communication therebetween.

30 Claims, 20 Drawing Sheets

Related U.S. Application Data

No. 15/724,492, filed on Oct. 4, 2017, now Pat. No. 10,261,745, which is a continuation of application No. 15/617,289, filed on Jun. 8, 2017, now Pat. No. 9,785,397, which is a continuation of application No. 15/279,088, filed on Sep. 28, 2016, now Pat. No. 9,678,704, which is a continuation of application No. 15/265,688, filed on Sep. 14, 2016, now Pat. No. 9,671,995, which is a continuation of application No. 14/717,858, filed on May 20, 2015, now Pat. No. 9,129,310, which is a continuation of application No. 14/598,005, filed on Jan. 15, 2015, now Pat. No. 9,477,972, which is a continuation of application No. 14/281,752, filed on May 19, 2014, now Pat. No. 8,965,785, which is a continuation of application No. 13/330,247, filed on Dec. 19, 2011, now abandoned.

(51) Int. Cl.
| | | |
|---|---|---|
| *H04B 5/00* | (2006.01) | |
| *G06F 3/0484* | (2013.01) | |
| *G06F 3/14* | (2006.01) | |
| *G06Q 30/02* | (2012.01) | |
| *H04W 76/14* | (2018.01) | |
| *G06Q 90/00* | (2006.01) | |
| *G06F 3/0482* | (2013.01) | |
| *G06F 3/0488* | (2013.01) | |
| *G06F 3/041* | (2006.01) | |
| *H04W 4/80* | (2018.01) | |

(52) U.S. Cl.
CPC ........ *G06F 3/0488* (2013.01); *G06F 3/04842* (2013.01); *G06Q 20/204* (2013.01); *G06Q 20/3278* (2013.01); *G06Q 30/0241* (2013.01); *G06Q 30/0267* (2013.01); *G06Q 90/00* (2013.01); *H04B 5/0025* (2013.01); *H04B 5/0031* (2013.01); *H04W 76/14* (2018.02); *H04W 4/80* (2018.02)

(58) Field of Classification Search
USPC .......................... 705/7.11–7.42, 14.1–14.73
See application file for complete search history.

(56) References Cited

U.S. PATENT DOCUMENTS

| | | | |
|---|---|---|---|
| 7,707,113 B1 | 4/2010 | DiMartino et al. | |
| 7,886,962 B2* | 2/2011 | Vawter | G06Q 20/00 235/379 |
| 7,894,771 B2* | 2/2011 | Son | G06K 7/10079 455/41.2 |
| 7,958,081 B2* | 6/2011 | Fitzpatrick | G06Q 10/06311 |
| 7,967,215 B2 | 6/2011 | Kumar et al. | |
| 8,005,465 B2 | 8/2011 | Salokannel et al. | |
| 8,016,192 B2 | 9/2011 | Messerges et al. | |
| 8,068,011 B1 | 11/2011 | Sajadi et al. | |
| 8,126,505 B2* | 2/2012 | Tulloch | G06Q 30/0246 455/41.1 |
| 8,126,806 B1 | 2/2012 | Dimartino et al. | |
| 8,165,635 B2 | 4/2012 | Khan et al. | |
| 8,220,719 B2 | 7/2012 | Johnson et al. | |
| 8,240,557 B2 | 8/2012 | Fernandes et al. | |
| 8,244,179 B2 | 8/2012 | Dua | |
| 8,284,061 B1* | 10/2012 | Dione | G06Q 30/0269 235/383 |
| 8,332,272 B2 | 12/2012 | Fisher | |
| 8,369,777 B2* | 2/2013 | Sugisaki | H04B 5/0056 455/41.1 |
| 8,401,474 B2* | 3/2013 | Charrat | G06Q 20/3278 455/41.2 |
| 8,458,363 B2 | 6/2013 | Rosenblatt et al. | |
| 8,463,184 B2 | 6/2013 | Dua | |
| 8,489,115 B2* | 7/2013 | Rodriguez | G01C 21/3629 455/456.1 |
| 8,516,521 B2* | 8/2013 | Dasgupta | G09B 7/00 434/365 |
| 8,548,381 B2 | 10/2013 | Dua | |
| 8,565,791 B1* | 10/2013 | Schilit | H04W 64/00 455/41.1 |
| 8,583,044 B2 | 11/2013 | Dua | |
| 8,688,147 B2* | 4/2014 | Nguyen | G06Q 30/0207 455/456.3 |
| 8,744,906 B2* | 6/2014 | Fordyce, III | G06Q 20/10 705/14.1 |
| 8,768,256 B2 | 7/2014 | Dua | |
| 8,818,867 B2 | 8/2014 | Baldwin et al. | |
| 8,849,705 B2* | 9/2014 | Khan | G06Q 20/12 705/26.1 |
| 8,965,785 B2 | 2/2015 | Lee et al. | |
| 8,971,803 B2 | 3/2015 | Dua | |
| 9,014,631 B2 | 4/2015 | Dua | |
| 9,020,429 B2 | 4/2015 | Dua | |
| 9,026,462 B2 | 5/2015 | Lin et al. | |
| 9,042,819 B2 | 5/2015 | Dua | |
| 9,070,149 B2 | 6/2015 | Lin et al. | |
| 9,082,117 B2 | 7/2015 | Chin | |
| 9,129,310 B1 | 9/2015 | Lee et al. | |
| 9,160,419 B2 | 10/2015 | Dua | |
| 9,160,420 B2 | 10/2015 | Dua | |
| 9,231,663 B2 | 1/2016 | Dua | |
| 9,231,664 B2 | 1/2016 | Dua | |
| 9,306,632 B2 | 4/2016 | Dua | |
| 9,401,743 B2 | 7/2016 | Dua | |
| 9,477,972 B2 | 10/2016 | Lee et al. | |
| 9,510,277 B2 | 11/2016 | Cheng et al. | |
| 9,671,995 B2* | 6/2017 | Lee | G06Q 30/0241 |
| 9,678,704 B2* | 6/2017 | Lee | G06Q 30/0241 |
| 9,743,445 B2 | 8/2017 | Dua | |
| 9,785,397 B1 | 10/2017 | Lee et al. | |
| 9,811,818 B1 | 11/2017 | Xing | |
| 10,004,096 B2 | 6/2018 | Dua | |
| 10,206,237 B2 | 2/2019 | Dua | |
| 10,261,745 B2 | 4/2019 | Lee et al. | |
| 10,296,889 B2 | 5/2019 | Lin et al. | |
| 2002/0164977 A1* | 11/2002 | Link, II | G06Q 30/02 455/414.1 |
| 2003/0024975 A1* | 2/2003 | Rajasekharan | G06F 16/9554 235/375 |
| 2005/0218218 A1* | 10/2005 | Koster | G06F 3/147 235/383 |
| 2006/0094356 A1* | 5/2006 | Dawidowsky | G06K 7/0008 455/41.1 |
| 2006/0123053 A1* | 6/2006 | Scannell, Jr. | G06F 16/437 |
| 2006/0192005 A1* | 8/2006 | Narui | G06Q 30/04 235/439 |
| 2006/0271328 A1* | 11/2006 | Forster | G01R 31/312 702/122 |
| 2007/0038516 A1* | 2/2007 | Apple | G06Q 30/02 705/14.42 |
| 2007/0136130 A1* | 6/2007 | Liu | G06Q 30/02 705/14.51 |
| 2007/0190939 A1* | 8/2007 | Abel | H04B 5/0031 455/41.2 |
| 2008/0027815 A1 | 1/2008 | Johnson et al. | |
| 2008/0030335 A1* | 2/2008 | Nishida | G01S 5/02 340/572.1 |
| 2008/0040219 A1* | 2/2008 | Kim | G06Q 30/02 705/14.26 |
| 2008/0058014 A1 | 3/2008 | Khan et al. | |
| 2008/0081631 A1* | 4/2008 | Rofougaran | H01Q 1/38 455/452.1 |
| 2008/0109302 A1* | 5/2008 | Salokannel | G06Q 30/02 705/14.1 |
| 2008/0132167 A1* | 6/2008 | Bent | H04W 4/02 455/41.2 |
| 2008/0155257 A1* | 6/2008 | Werner | H04L 9/0844 713/168 |

(56) References Cited

U.S. PATENT DOCUMENTS

| | | | |
|---|---|---|---|
| 2008/0207182 A1* | 8/2008 | Maharajh | G06Q 10/10 455/414.1 |
| 2008/0280558 A1* | 11/2008 | Arunan | H04W 28/06 455/41.1 |
| 2009/0018924 A1 | 1/2009 | Roberts | |
| 2009/0019061 A1* | 1/2009 | Scannell, Jr. | G06F 16/9577 |
| 2009/0037326 A1 | 2/2009 | Chitti et al. | |
| 2009/0156190 A1* | 6/2009 | Fisher | G06Q 40/02 455/418 |
| 2009/0160731 A1* | 6/2009 | Schuler | G06F 3/1423 345/1.1 |
| 2009/0170483 A1* | 7/2009 | Barnett | G06Q 20/32 455/414.2 |
| 2009/0177530 A1* | 7/2009 | King | G06Q 10/10 705/76 |
| 2009/0179733 A1* | 7/2009 | Hattori | G06K 17/0022 340/5.6 |
| 2009/0192912 A1 | 7/2009 | Griffin et al. | |
| 2009/0288012 A1 | 11/2009 | Hertel et al. | |
| 2010/0078471 A1 | 4/2010 | Lin et al. | |
| 2010/0078472 A1 | 4/2010 | Lin et al. | |
| 2010/0082444 A1 | 4/2010 | Lin et al. | |
| 2010/0082448 A1 | 4/2010 | Lin et al. | |
| 2010/0082485 A1 | 4/2010 | Lin et al. | |
| 2010/0082490 A1 | 4/2010 | Rosenblatt et al. | |
| 2010/0161410 A1* | 6/2010 | Tulloch | G06Q 30/02 705/14.45 |
| 2010/0161433 A1 | 6/2010 | White | |
| 2010/0178868 A1* | 7/2010 | Charrat | G06Q 20/3278 455/41.1 |
| 2010/0207742 A1 | 8/2010 | Buhot et al. | |
| 2010/0217674 A1 | 8/2010 | Kean | |
| 2010/0222021 A1 | 9/2010 | Balsan et al. | |
| 2011/0060652 A1* | 3/2011 | Morton | H04W 4/043 705/14.58 |
| 2011/0070828 A1* | 3/2011 | Griffin | H04M 1/7253 455/41.1 |
| 2011/0070834 A1* | 3/2011 | Griffin | G06K 7/0008 455/41.1 |
| 2011/0076943 A1* | 3/2011 | Chang | H04L 69/18 455/41.1 |
| 2011/0082747 A1* | 4/2011 | Khan | G06Q 10/00 705/14.58 |
| 2011/0087550 A1* | 4/2011 | Fordyce, III | G06Q 30/02 705/14.65 |
| 2011/0134036 A1 | 6/2011 | Suggs | |
| 2011/0191160 A1* | 8/2011 | Blackhurst | G06Q 20/20 705/14.38 |
| 2011/0202417 A1* | 8/2011 | DeWakar | G06Q 20/102 705/21 |
| 2011/0250839 A1* | 10/2011 | Lee | H04M 1/7253 455/41.1 |
| 2011/0258467 A1* | 10/2011 | Antoci | G06F 1/1632 713/310 |
| 2011/0264527 A1* | 10/2011 | Fitzpatrick | G06Q 30/02 705/14.55 |
| 2011/0313874 A1* | 12/2011 | Hardie | H04W 4/02 705/26.1 |
| 2011/0319016 A1* | 12/2011 | Gormley | H04M 1/274516 455/41.1 |
| 2011/0320317 A1* | 12/2011 | Yuan | G06Q 30/0601 705/26.61 |
| 2012/0023167 A1 | 1/2012 | Hovdal et al. | |
| 2012/0052801 A1 | 3/2012 | Kulkami | |
| 2012/0072943 A1 | 3/2012 | Pan | |
| 2012/0095819 A1* | 4/2012 | Li | G06Q 30/02 705/14.23 |
| 2012/0101944 A1 | 4/2012 | Lin et al. | |
| 2012/0110568 A1 | 5/2012 | Abel et al. | |
| 2012/0116887 A1 | 5/2012 | Norair | |
| 2012/0123841 A1 | 5/2012 | Taveau et al. | |
| 2012/0135681 A1 | 5/2012 | Adams et al. | |
| 2012/0143760 A1 | 6/2012 | Abulafia et al. | |
| 2012/0150591 A1* | 6/2012 | Mandyam | G06Q 30/0267 705/14.1 |
| 2012/0150601 A1* | 6/2012 | Fisher | H04W 4/21 705/14.23 |
| 2012/0159149 A1 | 6/2012 | Martin et al. | |
| 2012/0162032 A1* | 6/2012 | Yang | H01Q 1/2266 343/720 |
| 2012/0166333 A1 | 6/2012 | Behren et al. | |
| 2012/0167146 A1* | 6/2012 | Incorvia | H04N 21/234318 725/60 |
| 2012/0173318 A1* | 7/2012 | Lee | G06Q 30/0241 705/14.4 |
| 2012/0252360 A1 | 10/2012 | Adams et al. | |
| 2012/0254031 A1 | 10/2012 | Walker et al. | |
| 2012/0284105 A1* | 11/2012 | Li | G06O 30/02 705/14.23 |
| 2012/0290336 A1 | 11/2012 | Rosenblatt et al. | |
| 2012/0290396 A1* | 11/2012 | Petrov | G06Q 10/087 705/14.64 |
| 2012/0290472 A1 | 11/2012 | Mullen et al. | |
| 2012/0309309 A1 | 12/2012 | Cho et al. | |
| 2012/0310760 A1 | 12/2012 | Philips et al. | |
| 2012/0310826 A1 | 12/2012 | Chatterjee | |
| 2013/0080238 A1 | 3/2013 | Kelly et al. | |
| 2013/0085941 A1 | 4/2013 | Rosenblatt et al. | |
| 2013/0092741 A1* | 4/2013 | Loh | G06Q 20/32 235/492 |
| 2013/0110719 A1 | 5/2013 | Carter et al. | |
| 2013/0124319 A1 | 5/2013 | Hodge et al. | |
| 2013/0211971 A1 | 8/2013 | Lin et al. | |
| 2013/0215116 A1* | 8/2013 | Siddique | G06Q 30/0643 345/420 |
| 2013/0268400 A1* | 10/2013 | Ballard | G06Q 30/0641 705/26.8 |
| 2013/0290121 A1 | 10/2013 | Simakov et al. | |
| 2013/0309964 A1* | 11/2013 | Hall | H04B 5/00 455/41.1 |
| 2014/0065961 A1* | 3/2014 | Cox | H04W 52/0274 455/41.1 |
| 2014/0080411 A1* | 3/2014 | Konanur | H04B 5/0031 455/41.1 |
| 2014/0108260 A1 | 4/2014 | Poole et al. | |
| 2014/0252083 A1* | 9/2014 | Lee | G06Q 30/0241 235/375 |
| 2015/0127463 A1 | 5/2015 | Lee et al. | |
| 2015/0254722 A1 | 9/2015 | Lee et al. | |
| 2017/0004538 A1 | 1/2017 | Lee et al. | |
| 2017/0017456 A1 | 1/2017 | Lee et al. | |
| 2017/0048774 A1 | 2/2017 | Cheng et al. | |
| 2018/0046427 A1 | 2/2018 | Lee et al. | |
| 2018/0359797 A1 | 12/2018 | Dua | |
| 2019/0172053 A1 | 6/2019 | Lee et al. | |
| 2019/0235825 A1 | 8/2019 | Lee et al. | |

FOREIGN PATENT DOCUMENTS

| | | |
|---|---|---|
| JP | 2009-015662 A | 1/2009 |
| JP | 2009-157332 A | 7/2009 |
| JP | 2009-177530 A | 8/2009 |
| JP | 2010-074401 A | 4/2010 |

OTHER PUBLICATIONS

Hardy et al., "Mobile Interaction with Static and Dynamic NFC-based Displays", ACM, MobileHCI'10, Lisbon, Portugal—10 pages (Sep. 7-10, 2010).

Kessler, "Near Field Communication: A Quick Guide to the Future of Mobile", http://mashable.com/2011/08/11/near-field-communication-guide/#WKGR.15ZbEq2—8 pages (Aug. 11, 2011).

Nosowitz, "Everything You Need to Know about Near Field Communication; NFC is likely to pop up in your next smartphone (or maybe the one after that), and you'll use it for much more than just mobile payments", Popular Science, http://www.popsci.com/gadgets/article/2011-02/near-field-communication-helping-your-smartphone-replace-your-wallet-2010—5 pages (Mar. 1, 2011).

(56) References Cited

OTHER PUBLICATIONS

Office Action of corresponding Japanese Patent Application No. 2013-548333—3 pages (dated Aug. 28, 2014).
Office Action of corresponding Japanese Patent Application No. 2013-548333—2 pages (dated Mar. 24, 2015).
Rukzio et al., "Touch & Interact: Touch-based Interaction of Mobile Phones with Displays", Amsterdam, The Netherlands, ACM 978-1-59593-952-4/08/09—10 pages (Sep. 2-5, 2008).
Application of related U.S. Appl. No. 15/617,289.
Berger, SMRT launches NFC posters in Singapore, Oct. 18, 2011, https://www.nfcworld.com/2011/10/18/310763/smrt-launches-nfc-posters-in-singapore—2 pages.
Hardy et al., Mobile Interaction with Static and Dynamic NFC-based Displays, Sep. 7-10, 2010, Lisbon. Portugal; ACM 978-1-60558-835-3/10/09, pp. 123-132.
Kessler, Near Field Communication: A Quick Guide to the Future of Mobile, Aug. 11, 2011, http://mashable.com/2011/08/11/near-field-communication-guide/#WKGR.15ZbEq2—8 pages.
Video—Google Wallet Product Launch, published May 27, 2011. Source: https://www.youtube.com/watch?v=am8t6iZ7up0., printed Sep. 4, 2019.
Video—Google Wallet Demonstration, published May 26, 2011. Source: https://www.youtube.com/watch?v=6tBAB5is5vM, printed Sep. 4, 2019.
Video—Google Walletrzrii/iake Your Phone Your Wallet, published Aug. 21, 2012. Source: https://www.youtube.com/watch?v=cVDyd4G0uTU, printed Sep. 4, 2019.
Sprint—Ban Transport Trial Overview. published 2008. Source: https://members.nfc-forum.org/resources/presentations/Hans_Reisgies_ViVOtech.pdf.
NFC in Public Transport, published Jan. 2011. Source: https://nfc-forum.org/wp-content/uploads/2013/12/NFC-in-Public-Transport.pdf.
Kessler, "NFC Technology: 6 Ways It Could Change Our Daily Lives," Published May 6, 2010. Source: https://mashable.com/2010/05/06/near-field-communication/.
Emilie, "Create and Read NFC Tags With Springcard NFC Tool and NFC Decorder," Published Aug. 2, 2010. Source: http://tech.springcard.com/2010/nfc-tags-with-nfctool-and-nfcdecoder/.
Dodson, et al., Touch and Run With Near Field Communication (nfc). Published Oct. 2010. Source: https://mobisocial.stanford.edu/papers/nfc.pdf.
Martin, "NFC is More Than Just Payments," Published Feb. 3, 2009. Source: https://www.secureidnews.com/news-item/nfc-is-more-than-just-payments/.

* cited by examiner

NFC-ENABLED APPARATUS AND METHOD OF OPERATION THEREOF

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

The present disclosure relates to the provision of information to a mobile terminal using near field communication (NFC).

Description of the Related Art

Advertising is to provide characteristic information about a specific commodity or service (hereinafter referred to as the "commodity") to potential consumers and customers in order to promote the sales and distribution of the commodity, and corresponds to one-way communication.

Advertising media includes a variety of media such as wallpaper, a poster, a signboard, street facilities, a leaflet, radio, a movie, TV, a web banner, a popup advertisement, a magazine, a newspaper, a sticker, and a shopping cart.

However, such advertising media utilize still images, and therefore the amounts of information to be provided are limited. Although moving image information is utilized recently, it is difficult to repeatedly view and analyze the moving image information which is played.

Meanwhile, mobile terminals are communication devices which have the advantage of being able to wirelessly connect to a mobile communication system, and wirelessly connect to and communicate with desired counterparties anytime and anywhere while moving. Such mobile terminals are always carried because of the characteristic of communication that communication may be made anytime and anywhere, but have low utilization rate because the period for which they are actually utilized for communication is short.

Therefore, in order to increase the utilization rate of mobile terminals, additional functionalities, such as E-book, MP3, camera, recorder, scanner, multimedia player, and game machine functionalities, have been added to the mobile terminals. Recently, mobile phones to which tablet computer functionality has been added have been introduced under the name of smartphones. The development of mobile phones to which functionality is added tends to continue.

Furthermore, short-distance wireless communication functionality, such as Bluetooth, Radio Frequency Identification (RFID), and/or Near Field Communication (NFC), is added to mobile terminals, and therefore the mobile phones can perform tag functionality for managing the history information of commodities, smartcard functionality for performing electronic payment, and/or Peer-to-Peer (P2P) functionality for performing one-to-one communication.

Conventional advertising media have the disadvantages of instantaneously providing information, and being unable to review the content of an advertisement when a person moves away from a location where the advertisement is made. Conventional moving image-based advertising media also have the disadvantages of being unable to review the content of an advertisement over time, being unable to represent information using a moving image at times, and being unable to review the content of an advertisement when a person moves away from a location where the advertisement is made.

That is, conventional advertising media is disadvantageous in that it is difficult to review the content of an advertisement when a person moves away from a location where the advertisement is made, a still image advertisement can represent a relatively limited amount of information, and a moving image advertisement cannot represent information which needs to be reviewed and analyzed for a long time, such as a railway schedule.

Therefore, there is a need for a technology which receives the content of an advertisement from an advertisement medium, records the advertisement in a mobile terminal, and allows a user to repeatedly review and analyze the content of the advertisement when the user moves away from the advertising medium and needs to repeatedly review and analyze the content of the advertisement for a long time.

Mobile terminals are communication devices which are capable of wirelessly connecting to and communicating with desired counterparties anytime and anywhere while moving within service areas. Such mobile terminals which are always carried to prepare for communication that may be made anytime and anywhere have low utilization rate because the period for which they are actually utilized for communication is short. The utilization rate of mobile terminals tends to be increased by adding additional functionalities, such as E-book, MP3, camera, recorder, scanner, multimedia player, and game machine functionalities, to the mobile terminals Recently, the utilization rate of mobile terminals is further increased by adding NFC functionality for performing tag functionality, smartcard functionality and P2P functionality.

Since current mobile terminals tend to be equipped with NFC functionality, a mobile terminal will be described as being an NFC mobile terminal in the following description.

Furthermore, thanks to the development of communication technology, the development of manufacturing technology and the improvement of mass production technology, the price of NFC mobile terminals and the communication cost have been reduced, and each adult has about one NFC mobile terminal with the advent of the personal communication era.

Meanwhile, a purchaser who purchases a commodity has prior knowledge about the corresponding commodity and purchase the commodity selected at need, while a vendor generally perform the promotion or advertising of his or her commodity so that the commodity can be selected by many purchasers.

Purchasers may hesitate or may not immediately make up his or her mind when there is a plurality of commodities of the same type or a similar type.

A barcode or a Quick Response (QR) code indicative of information, such as the name, manufacturer, price, release date, expiration date, serial number and location of a commodity, is represented on a commodity.

Conventionally, information about a commodity, such as the advertisement, use and functionality of the commodity, is provided using advertising leaflets, specifications and promotion materials in the form of a discontinuous and concentrated event.

Therefore, it is difficult for a user or a purchaser to obtain the advertisement information of a commodity in such an event where the commodity is advertised. Furthermore, even when a person participates in such an event and becomes aware of the advertisement information of a commodity, the person forgets the information over time, and therefore the effect of such advertising is very low.

Furthermore, since specific information about a commodity, such as the advertisement information, expiration date and use of the commodity, is frequently changed and updated, it is difficult to provide accurate information to purchasers.

Therefore, there is a need for the development of a technology which is capable of providing information about each commodity (hereinafter referred to as "commodity information") including, for example, the advertisement information, promotion information, name, release date, expiration date, manufacturer, serial number and price information of the commodity using a QR code or a barcode (hereinafter referred to as an "optical code") which is represented on the commodity.

In particular, there is a need for the development of a technology which is capable of providing commodity information, included in an optical code represented on each commodity, to an NFC mobile terminal which is being carried by an individual person using NFC communication, so that a purchaser can rapidly check accurate commodity information.

The foregoing information included in this section is only to provide background of the invention and does not constitute an admission of prior art.

SUMMARY

One aspect of the invention provides an apparatus comprising: a display device configured to display a plurality of contents comprising a first content and a second content; a near field communication (NFC) module comprising at least one NFC antenna configured to provide data related to the plurality of contents for sending to an NFC-enabled mobile terminal when the NFC-enabled mobile terminal tags the at least one NFC antenna and establishes an NFC channel between the NFC-enabled mobile terminal and at least one NFC antenna; and an operation control connected to the display device and the NFC module for providing the plurality of contents to the display device and further for providing the data related to the plurality of contents to the NFC module, wherein the apparatus is configured to allow selection of one of the first and second contents while both the first and second contents are being displayed on the displayed device, wherein upon selection of the first content, the operation control is further configured to cause the NFC module to send, to the NFC-enabled mobile terminal, the first data related to the first content in response to tagging on the at least one NFC antenna with the NFC-enabled mobile terminal.

In the foregoing apparatus, the operation control may be configured to control the display device and the NFC module such that the at least one NFC antenna may be caused to send, to the NFC-enabled mobile terminal, second data related to the second content when the NFC-enabled mobile terminal tags the at least one NFC antenna while the display device is displaying the second content. The operation control may be configured to receive the plurality of contents and the data related to the plurality of contents from a content management server that is external to the apparatus. The operation control may be further configured to control the display device and the NFC module such that the display device and the NFC module are synchronized with each other in displaying the plurality of contents and in providing the data related to the plurality of contents.

In the foregoing apparatus, the display device may comprise a touch-active screen configured to allow selection of one of the plurality of contents by touch, wherein the operation control may be further configured to control the display device and the NFC module such that the NFC module may be caused to send, to the NFC-enabled mobile terminal, the first data related to the first content in response to tagging with the NFC-enabled mobile terminal after the first content may be selected by touch while the display device may be displaying the plurality of contents comprising the first content. The display device may comprise a touch-active screen configured to allow selection of one of the plurality of contents by touch, wherein the operation control may be further configured to control the display device and the NFC module such that the NFC module may be caused to send, to the NFC-enabled mobile terminal, second data related to the second content in response to tagging with the NFC-enabled mobile terminal in case no content may be selected while the display device may be displaying the plurality of contents comprising the first content.

In the foregoing apparatus, the at least one NFC antenna may comprise a first NFC antenna and a second NFC antenna, wherein the first NFC antenna may be configured to be loaded with the first data related to the first content for sending upon tagging with an NFC-enabled mobile terminal, wherein the second NFC antenna may be configured to be loaded with second data related to the second content for sending upon tagging with an NFC-enabled mobile terminal. The display device, the at least one NFC antenna and the operation control are installed in an integrated body. The at least one NFC antenna may be provided adjacent to the display device. The apparatus may further comprise a code display configured to display at least one code related to at least one of the plurality of contents displayed on the display device, wherein the operation control may be further configured to control the display device and the code display such that the code display may be caused to display a first code related to the first content when the display device displays the first content.

In the foregoing apparatus, the first content may comprise a moving image, wherein the first data related to the first content may comprise data configured for causing to display the same moving image of the first content on the NFC-enabled mobile terminal. The first content may comprise a multimedia content. The first content may comprise an advertisement for a first commodity, wherein the first data related to the first content may further comprise data configured for causing to display another content related to the first commodity. The NFC module may be configured to operate in a card mode and in a read mode, wherein the NFC-enabled mobile terminal may be configured to operate in a card mode and in a read mode, wherein the NFC module may be programmed to send a mode change request to the NFC-enabled mobile terminal when tagging of the NFC-enabled mobile terminal with the at least one NFC antenna is made while the NFC-enabled mobile terminal is in its card mode and the NFC module is in its read mode, wherein the NFC module may be further programmed to change from its read mode to its card mode upon receipt, from the NFC-enabled mobile terminal, of a mode change confirmation indicating that the NFC-enabled mobile terminal has changed its mode from its card mode to its read mode.

Another aspect of the invention provides a digital signage system comprising: the foregoing apparatus according to one aspect of the invention; a content management server external to the apparatus and configured to supply, to the apparatus, the plurality of contents and the data related to the plurality of contents. The foregoing system may further comprise a first NFC-enabled mobile terminal configured to receive, from the at least one NFC antenna, the first data related to the first content upon tagging with the at least one NFC antenna while the display device is displaying the first content.

In the foregoing system, the first NFC-enabled mobile terminal may be configured to operate in a card mode and in a read mode, wherein the NFC module may be configured to operate in a card mode and in a read mode, wherein the NFC module may be programmed to send a mode change request to the first NFC-enabled mobile terminal when tagging of the first NFC-enabled mobile terminal with the at least one NFC antenna is made while the first NFC-enabled mobile terminal is in its card mode and the NFC module is in its read mode, wherein the NFC module may be further programmed to change from its read mode to its card mode upon receipt, from the first NFC-enabled mobile terminal, of a mode change confirmation indicating that the first NFC-enabled mobile terminal has changed its mode from its card mode to its read mode. The operation control may be configured to control the display device and the NFC module such that the display device and the NFC module are synchronized with each other in displaying the plurality of contents and in providing the data related to the plurality of contents.

In the foregoing system, the display device may comprise a touch-active screen configured to allow selection of one of the plurality of contents by touch, wherein the operation control may be further configured to control the display device and the NFC module such that the NFC module may be caused to send, to the first NFC-enabled mobile terminal, first data related to the first content in response to tagging with the first NFC-enabled mobile terminal after selection of the first content by touch while the display device may be displaying the first content. The display device may comprise a touch-active screen configured to allow selection of one of the plurality of contents by touch, wherein the operation control may be further configured to control the display device and the NFC module such that the NFC module may be caused to send, to the first NFC-enabled mobile terminal, first data related to the first content in response to tagging with the first NFC-enabled mobile terminal even if no content is selected via the touch-active screen while the display device is displaying the first content. The at least one NFC antenna may comprise a first NFC antenna and a second NFC antenna, wherein the first antenna may be configured to be loaded with the first data related to the first content for sending upon tagging with the first NFC-enabled mobile terminal, wherein the second antenna may be configured to be loaded with second data related to the second content for sending upon tagging with the first NFC-enabled mobile terminal.

Another aspect of the invention provides a method of distributing advertisements. The method comprising: providing the foregoing apparatus according to one aspect of the invention; displaying a plurality of contents comprising a first content and a second content on the display device, wherein the first content may be displayed on the display device while the second content is also displayed on the display device; receiving an input of selecting one of the first and second contents while both the first content and the second content are being displayed on the display device; providing data related to a selected one of the first and second contents to the NFC module such that the first data becomes available on the at least one NFC antenna when the first content is selected by the input and that the second data becomes available on the at least one NFC antenna when the second content is selected by the input; in response to tagging on the at least one NFC antenna with an NFC-enabled mobile terminal, establishing an NFC channel between the at least one NFC antenna and the NFC-enabled mobile terminal; and sending the data related to the selected content to the NFC-enabled mobile terminal via the NFC channel, wherein the first data may be sent to the NFC-enabled mobile terminal when the first content is selected by the input whereas the second data may be sent to the NFC-enabled mobile terminal when the second content is selected by the input.

The foregoing method may further comprise: receiving the first and second contents from a content management server; and receiving the first and second data from the content management server. The foregoing method may further comprise: supplying the plurality of contents to the apparatus; and supplying data related to the plurality of contents to the apparatus. In the foregoing method, the operation control may control the display device and the NFC module such that the display device and the NFC module are synchronized with each other in displaying the plurality of contents and in providing the data related to the plurality of contents. The display device may comprise a touch-active screen configured to allow selection of one of the plurality of contents by touch, wherein the operation control controls the display device and the NFC module such that the NFC module may be caused to send, to the NFC-enabled mobile terminal, the first data in response to tagging with the NFC-enabled mobile terminal when the first content is selected by touch and that the NFC module may be caused to send, to the NFC-enabled mobile terminal, the second data in response to tagging with the NFC-enabled mobile terminal when the first content is selected by touch.

In the foregoing method, the display device may comprise a touch-active screen configured to allow selection of one of the plurality of contents by touch, wherein the operation control may control the display device and the NFC module such that the NFC module may be caused to send, to the NFC-enabled mobile terminal, data related to a predetermined one of the plurality of contents in response to tagging with the NFC-enabled mobile terminal when no content is selected while the display device is displaying the plurality of contents. The at least one NFC antenna may comprise a first NFC antenna and a second NFC antenna, wherein the first antenna may be loaded with the first data and the second antenna may be loaded with the second data while the first and second contents are displayed on the display device.

In the foregoing method, the first data related to the first content may comprise data configured for causing to display the same first content on the NFC-enabled mobile terminal. The NFC module may be configured to operate in a card mode and in a read mode, wherein the NFC-enabled mobile terminal may be configured to operate in a card mode and in a read mode, wherein establishing the NFC channel may comprise: detecting tagging on the at least one NFC antenna with the NFC-enabled mobile terminal; sending, from the apparatus, a mode change request to the NFC-enabled mobile terminal when the tagging is made while the NFC-enabled mobile terminal is in its card mode and the NFC module is in its read mode; receiving, from the NFC-enabled mobile terminal, a mode change confirmation indicating that the NFC-enabled mobile terminal has changed its mode from its card mode to its read mode; and changing the NFC module's mode from its read mode to its card mode.

An aspect of the present invention is to provide an advertisement information provision system which is capable of receiving the content of an advertisement from an advertisement output medium in the form of data, recording the content of the advertisement in a mobile terminal, allowing a user to repeatedly play back and view the content of the advertisement when the user has moved to a remote location and needs to review it, and allowing the user to review the content of the advertisement over time.

Another aspect of the present invention is to provide an advertisement information provision system which is capable of outputting a variety of types of advertisements using a single advertisement output medium.

Another aspect of the present invention is to provide a commodity information provision system which is capable of recognizing an optical code represented on a commodity, converting commodity information, included in the optical code, into NFC tag applet information, and transmitting the NFC tag applet information to an NFC mobile terminal so that a user can view the commodity information.

Still another aspect of the present invention is to provide an NFC tag generation device and an NFC tag transmission method which are capable of receiving content from a content output device in the form of tag data and recording the tag data in a mobile terminal.

Still another aspect of the present invention is to provide an NFC tag generation device and an NFC tag transmission method which are capable of outputting a variety of types of pieces of content using a single content output device and setting a suitable transmission method for corresponding content.

According to an embodiment of the present invention, a system for providing advertisement information includes a mobile terminal configured to operate in card mode in its initial stage, switch to read mode in response to a request for mode-switching, search for and output AID information, and receive data of advertisement media using tagging; a panel unit configured to send the request for mode-switching to the mobile terminal, switch from read mode in its initial stage to card mode in response to a request for mode-switching from the mobile terminal, output received the advertisement media, and, radiate and transfer the advertisement media as data when the mobile terminal performs the tagging; and an advertisement management server configured to search for or create in real time the advertisement media, and output and provide the advertisement media, together with a matched tag applet in response to a request from the panel unit.

The panel unit may include a panel operation unit configured to receive the advertisement media and the matched tag applet from the advertisement management server and record the advertisement media and the matched tag applet in an assigned area; and an advertisement output unit configured to, under the control of the panel operation unit, output the advertisement media as multimedia signal, radiate the matched tag applet, and radiate the advertisement media as data when the mobile terminal tags the radiated tag applet.

The advertisement output unit may include an output unit for outputting the advertisement media as the multimedia signal under the control of the panel operation unit; and an antenna unit configured to selectively radiate the matched tag applet and the advertisement media under the control of the panel operation unit; wherein the antenna unit is configured to, after radiating the matched tag applet, detect the tagging of the mobile terminal and perform transfer of the advertisement media to the panel operation unit.

The panel operation unit may include a process unit configured to connect to the advertisement management server, and receive the advertisement media provided from the advertisement management server; a tag applet unit configured to record and store the advertisement media and the matched tag applet in respective assigned areas under the control of the process unit; an NFC controller unit configured to, when the advertisement output unit detects the tagging of the mobile terminal, output the advertisement media as data under the control of the process unit, the NFC controller unit configured to, when the mobile terminal performs the tagging, send the request for mode-switching to the mobile terminal to switch to read mode, and switch to the card mode after determining that the mobile terminal is switched to read mode; and an advertisement signal processing unit configured to output the advertisement media as a multimedia signal under the control of the process unit.

The output unit may include a plurality of output units and the antenna unit may include a plurality of antenna units; the plurality of output units and the plurality of antenna units may be paired into a plurality of pairs; an output unit of each pair may connect to the advertisement signal processing unit of the panel operation unit and output the advertisement media; and an antenna unit of the each pair may connect to the NFC controller unit of the panel operation unit, and selectively radiate the matched tag applet and the data of the advertisement media.

The advertisement signal processing unit may output a plurality of advertisement media at different times under the control of the process unit; and the NFC controller unit may output the tag applet which is matched when the advertisement signal processing unit outputs the advertisement media, and output the data of the advertisement media if the tagging of the mobile terminal is detected when the matched tag applet is output.

The advertisement management server may include a control unit configured to receive a signal of the request of the tag applet from the panel unit; an advertisement radiation DB unit configured to, under the control of the control unit, create or search for the advertisement media in real time, create the matched tag applet and transfer the advertisement media and the matched tag applet to the panel unit; and a tag applet DB unit configured to record the advertisement media and the tag applet matched to the advertisement media in respective tables under the control of the control unit.

The advertisement management server may further include an advertisement tag applet unit configured to create the tag applet under the control of the control unit.

The mobile terminal may further include a scanner unit configured to scan a QR code and a barcode; the panel unit further may include a QR code analysis unit configured to analyze the QR code, a barcode analysis unit configured to analyze the barcode, and a code radiation unit configured to radiate tag applets of the QR code and the barcode; and the advertisement management server may further include a QR code tag applet unit configured to create the tag applet of the QR code and a barcode tag applet unit configured to create the tag applet of the barcode.

According to another embodiment of the present invention, a system for providing commodity information, includes an apparatus unit configured to include a panel unit for capturing and displaying an optical code of a commodity, and an operation unit for recognizing the optical code captured by the panel unit and converting the optical code into commodity data; and a server unit configure to receive the commodity data transmitted by the operation unit, convert the commodity data into a tag applet, and transmit the tag applet to the operation unit; wherein the operation unit records the tag applet transmitted by the server unit, convert the tag applet into an NFC signal, and output the NFC signal to the panel unit; and wherein the panel unit transmits the tag applet to a tagging NFC mobile terminal using NFC communication.

The panel unit may include a camera unit configured to capture the optical code including a QR code of the commodity; an output unit configured to output and display the optical code captured by the camera unit; and an NFC antenna unit configured to wirelessly transmit the NFC signal output by the operation unit.

The operation unit may include an QR analysis unit configured to receive the optical code captured by the panel unit, recognize and analyze a QR code, and convert the QR code into the commodity data; a process unit configured to receive the commodity data from the QR analysis unit, output the commodity data to the server unit, and receive the tag applet from the server unit; an NFC controller unit configured to, under the control of the process unit, convert the tag applet into the NFC signal and output the NFC signal to the panel unit; and a tag applet recording unit configured to record or delete the tag applet under the control of the NFC controller unit.

The panel unit may further include a barcode scanner unit configured to scan the optical code including a barcode of the commodity.

The operation unit may further include a barcode analysis unit configured to receive the optical code from the panel unit, recognize and analyze a barcode, and covert the barcode into commodity data.

The server unit may include a tag applet issuance unit configured to receive the commodity data from the operation unit and convert the commodity data into the tag applet; a commodity information DB unit configured to receive the commodity data from the operation unit and search for corresponding commodity information; and a control unit configured to perform control so that the commodity information found by the commodity information DB unit is applied to the tag applet issuance unit and the commodity data and the matched commodity information into the tag applet.

The panel unit may include a camera unit configured to capture an optical code including a QR code of the commodity; an output unit configured to output and display the optical code captured by the camera unit; and an NFC antenna unit configured to wirelessly transmit a tag applet, output by the operation unit, as an NFC signal; wherein the output unit outputs and displays the commodity information output by the operation unit, or outputs and displays the optical code captured by the camera unit.

The operation unit may include an QR analysis unit configured to receive the optical code captured by the panel unit, recognize and analyze a QR code, and convert the QR code into commodity data; a process unit configured to receive the commodity data from the QR analysis unit, output the commodity data to the server unit, and receive the tag applet from the server unit; an NFC controller unit configured to, under the control of the process unit, convert the tag applet into the NFC signal and output the NFC signal to the panel unit; a tag applet recording unit configured to record or delete the tag applet under the control of the NFC controller unit; and an output control unit configured to convert the tag applet into a multimedia signal and output the multimedia signal to the panel unit; wherein the process unit outputs the tag applet to both the NFC controller unit and the output control unit.

The panel unit may further include a barcode scanner unit configured to scan an optical code including a barcode of the commodity.

The operation unit may further include a barcode analysis unit configured to receive the optical code from the panel unit, recognize and analyze a barcode, and covert the barcode into commodity data.

According to still another embodiment of the present invention, a system for providing commodity information, includes an apparatus unit configured to include a panel unit for capturing and displaying an optical code of a commodity, and an operation unit for recognizing the optical code captured by the panel unit, converting the optical code into commodity data, and converting the commodity data into a tag applet and output the tag applet to the panel unit; and wherein the panel unit transmits the tag applet to a tagging NFC mobile terminal using NFC communication.

The system may further include a server unit configured to include a commodity information DB unit for connecting to the operation unit and recording a plurality of pieces of commodity information linked using link information.

The panel unit may include a camera unit configured to capture an optical code including a QR code of the commodity; an output unit configured to output and display the optical code captured by the camera unit or the commodity information output by the operation unit; and an NFC antenna unit configured to wirelessly transmit the tag applet as an NFC signal.

The operation unit may include an QR analysis unit configured to receive the optical code captured by the panel unit, recognize and analyze a QR code, and convert the QR code into the commodity data; a process unit configured to receive the commodity data from the QR analysis unit; an NFC controller unit configured to, under the control of the process unit, convert an applied signal into an NFC signal and output the NFC signal to the panel unit; a tag applet recording unit configured to record or delete the applied signal under the control of the NFC controller unit; an output control unit configured to convert the applied signal into a multimedia signal and output the multimedia signal to the panel unit; and a tag applet issuance unit configured to convert the commodity data, provided by the process unit, into the tag applet.

The process unit may be configured to analyze the commodity data, separate link information from the commodity data, and provide the link information to the server unit.

The server unit may include a commodity information DB unit configured to search for commodity information corresponding to the link information; and a tag applet issuance unit configured to receive the commodity information found by the commodity information DB unit and convert the commodity information into the tag applet.

The panel unit may further include a barcode scanner unit configured to scan the optical code including a barcode of the commodity.

The operation unit may further include a barcode analysis unit configured to receive the optical code from the panel unit, recognize and analyze the barcode, and covert the barcode into commodity data.

According to yet another embodiment of the present invention, an NFC tag generation device includes a content output unit configured to output one or more pieces of content, and receive a selection of content using a user's manipulation or predetermined default setting; an operation control unit for searching for a tag data corresponding to the selected content; an NFC controller unit configured to set transmission mode corresponding to the tag data; a memory unit configured to store the content and the tag data; a communication interface unit configured to update information about the content or tag data with information about new content or tag data; and an NFC antenna unit configured to transmit the tag data using NFC communication; wherein the operation control unit transfers a control signal requesting switching to transmission mode corresponding to the selected content to the NFC controller unit.

The NFC tag may further include at least one tag recording unit for temporarily recording tag data to be transmitted to an outside; wherein the operation control unit transfers a recording control signal recording the found tag data in the tag recording unit to the NFC controller unit.

The tag recording unit may be included in one of more selected from among the operation control unit, the NFC controller unit and the memory unit.

The content output unit may include a touch screen; and the content may be output via the touch screen, and the content to be transmitted may be selected by touching the touch screen.

According to yet another embodiment of the present invention, an NFC tag transmission method including: outputting one or more pieces of content which can be played back to a first terminal; selecting content to be transmitted from among the one or more pieces of content; activating transmission mode corresponding to the selected content; searching for tag data corresponding to the content; establishing a data transmission session between a second terminal and the first terminal; and transmitting the tag data from the second terminal to the first terminal.

The NFC tag transmission method, may further include running an application corresponding to the transmission mode between the activating and the searching.

The NFC tag transmission method may further include requesting, at the second terminal, tag data from the first terminal between the outputting and the selecting, and the selection of the content is performed by using a predetermined method in response to the request from the first terminal; activating transmission mode corresponding to the selected content; searching for tag data corresponding to the content; and transmitting the tag data from a second terminal to the first terminal.

BRIEF DESCRIPTION OF THE DRAWINGS

The above and other aspects, features and advantages of the present invention will be more clearly understood from the following detailed description taken in conjunction with the accompanying drawings, in which.

DESCRIPTION OF EMBODIMENTS

Figure 1:
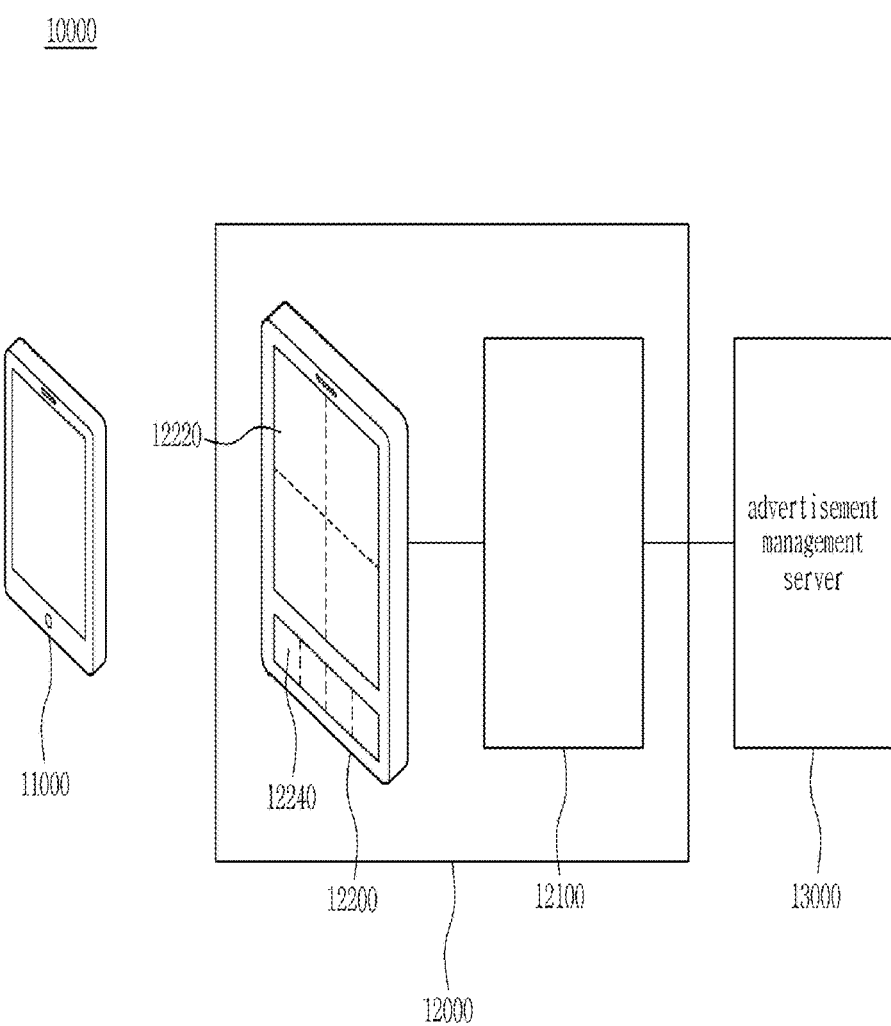
FIG. 1 is a functional block diagram illustrating the configuration of an advertisement information provision system according to an embodiment of the present invention.

Reference now should be made to the drawings, in which the same reference numerals are used throughout the different drawings to designate the same or similar components.

The present invention may be modified in a variety of ways, and may include a variety of embodiments. Specific embodiments will be illustrated in the accompanying drawings and described in detail below. However, it should be appreciated that this is not intended to limit the present invention to the specific embodiments, but the present invention includes all modifications, equivalents and alternatives which fall within the spirit and technical range of the present invention. Descriptions of well-known functions and constructions which have been deemed to make the gist of the present invention unnecessarily vague will be omitted below.

In the present invention, an advertisement medium is described as being a multimedia signal including an image(s), a character(s), and a sound signal, and an operation applet is described as being an application program which performs control for a selected application.

That is, a mobile terminal includes a plurality of application programs, each of the application programs is referred to as an operation applet, and the application programs are identified by respective pieces of applet identifier (AID) information. Furthermore, the same applets may be assigned different pieces of applet identifier (AID) information when their versions or manufacturers are different.

When a mobile terminal communicates with a counterparty mobile terminal, or a mobile terminal operates a specific application program in conjunction with a counterparty mobile terminal in a one-to-one correspondence, they should include and operate the same applets having the same applet identifier (AID) information.

Communication mode in which signals are transmitted and received in NFC communication includes card mode and read mode. The card mode is described as being mode in which recorded information signals are provided to a counterparty, and the read mode is described as being mode in which the recorded information signals of a counterparty are read.

A barcode is a linear one-dimensional (1D) code which is formed by combining a plurality of white and black bars having different widths and can be easily read by a computer, and is widely used to represent the unique number and/or price information of a commodity.

A Quick Response (QR) code is a matrix-type two-dimensional (2D) code which is formed by arranging small square dots equally in lateral and vertical directions and can be read by a computer. A QR code may have on its each side dots the number of which ranges from 21 to 177, can record a maximum of 23,648 bits, can be recovered thanks to its supplementary property when part of its data is damaged, and can be recognized or read in all directions of 360 degrees.

Tagging or tag is described as being the state of being close to a counterparty without electrically direct contact.

FIG. 1 is a functional block diagram illustrating the configuration of an advertisement information provision system 10000 according to an embodiment of the present invention.

Referring to FIG. 1, the advertisement information provision system 10000 according to the embodiment of the present invention will now be described in detail. The advertisement information provision system 10000 includes a mobile terminal 11000, a panel unit 12000, and an advertisement management server 13000.

The mobile terminal 11000 is a mobile communication terminal capable of wirelessly accessing a mobile communication system and immediately communicating with a desired counterparty ubiquitously, and records a plurality of operation applets, identified by applet identifier (AID) information, in an assigned memory area.

The mobile terminal 11000 operates in card mode in its initial stage, tags the panel unit 12000, searches for a record of designated applet identifier (AID) information from the plurality of recorded applet identifier (AID) information in response to a request from the panel unit 12000, and notifies the panel unit 12000 of search results once the record of designated AID information has been retrieved.

In the following description of the present invention, the mobile terminal 11000 will be described as recording a designated operation applet, and an applet corresponding to applet identifier (AID) information requested by the panel unit 12000 will be described as an operation applet capable of receiving advertisement media.

The fact that the mobile terminal 11000 has retrieved AID information designed by the panel unit 12000 means that the mobile terminal 11000 and the panel unit 12000 can activate the same operation applet and then perform data communication without suffering from errors.

The mobile terminal 11000 wakes up an operation applet corresponding to the designated applet identifier (AID) information, that is, an operation applet capable of receiving advertisements, so that it can enter an active state in response to a mode-switching request from the panel unit 12000, switches the operating mode from the initial card mode to read mode, and notifies the panel unit 12000 of the results of the wake-up and the mode-switching.

In this case, the mobile terminal 11000 additionally transmits a mode-switching request signal, requesting switching to card mode, to the panel unit 12000.

Furthermore, the mobile terminal 11000 receives advertisement media data from the panel unit 12000 while staying in a tagged state, and notifies the panel unit 12000 of the completion of the reception if the reception is completed without undergoing errors.

The panel unit 12000 includes a panel operation unit 12100 and an advertisement output unit 12200. The panel operation unit 12100 includes a process unit 12110, a tag applet unit 12120, an NFC controller unit 12130, and an advertisement signal processing unit 12140. The advertisement output unit 12200 includes an output unit 12220 and an antenna unit 12240.

When a mobile terminal 11000 tags the panel unit 12000 in initial read mode in which the information of a counterparty is read, the panel unit 12000 request a search for corresponding applet identifier (AID) information to check whether an operation applet for receiving an advertisement has been recorded in the mobile terminal 11000, and requests that the mobile terminal 11000 switches to read mode when receiving search results.

The process unit 12110 which constitutes a part of the panel operation unit 12100 of the panel unit 12000 requests a tag applet, including advertisement media, from the connected advertisement management server 13000, and receives the tag applet.

In the following description, a tag applet will be described as being matched to a corresponding advertising medium, and advertisement media will be described as multimedia including a still image(s), a moving image(s), a character(s), a sound(s), and/or an image(s), but not limited thereto.

The process unit 12110 records the received advertisement media and tag applet in respective assigned areas of the tag applet unit 12120. There are a variety of types of tag applets depending on the contents and purposes of advertisements, and the tag applet unit 12120 records tag applets which are matched to a plurality of various advertisement media.

Since the process unit 12110 performs control so that any advertisement media selected from among those recorded in the tag applet unit 12120 is applied and output to the advertisement signal processing unit 12140, the advertisement signal processing unit 12140 classifies the applied advertisement media as a multimedia signal including an image(s), a sound(s), or a character(s) and outputs the multimedia signal to the output unit 12220 of the advertisement output unit 12200.

The output unit 12220 includes a video unit for outputting video signals and character signals and an audio unit for outputting sound signals.

Meanwhile, the process unit 12110 performs control so that a tag applet matched to an advertisement medium output by the advertisement signal processing unit 12140 can be read from the tag applet unit 12120, and be applied to and output by the NFC controller unit 12130.

Since the NFC controller unit 12130 outputs the applied tag applet to the antenna unit 12240 of the advertisement output unit 12200, the antenna unit 12240 can radiate a signal which resonates with, for example, a radio frequency in the 13.56 MHz band.

In an embodiment, when the mobile terminal 11000 tags the antenna unit 12240, the antenna unit 12240 detects the tagging of the mobile terminal 11000 and provides notification to the NFC controller unit 12130 of the panel operation unit 12100, and the NFC controller unit 12130 requests a search for applet identifier (AID) information to check if the AID information of the operation applet which will receive an advertisement has been recorded in the mobile terminal and outputs a signal requesting the mode-switching of the mobile terminal 11000 if the corresponding AID information has been retrieved and returned.

The NFC controller unit 12130 checks if the mobile terminal 11000 has switched to read mode in response to a mode-switching request, and performs switching to card mode which provides recorded data when a signal requesting mode-switching is received from the mobile terminal 11000.

When the switching to card mode has been performed, the NFC controller unit 12130 searches for advertisement media, being currently output by the output unit 12220, from the tag applet unit 12120 and then outputs the advertisement media to the antenna unit 12240 under the control of the process unit 12110, and the antenna unit radiates data to the mobile terminal 11000.

Here, the output unit 12220 and the antenna unit 12240 may be paired with each other, and may output and radiate advertisement media of the same content under the control and monitoring of the process unit 12110.

Therefore, when the output unit 12220 and the antenna unit 12240 form a single pair in accordance with the embodiment, a plurality of advertisement media is output at different times. When output units 12220 and antenna units 12240 form a plurality of pairs in accordance with another embodiment, a plurality of advertisement media can be simultaneously output and provided via respective paths. The different configurations according to the embodiment of the panel unit 12000 will be described in detail below with reference to the accompanying drawing.

The advertisement management server 13000 may create and provide a plurality of advertisement media in real time or search for and provide one or more of a plurality of recorded advertisement media in response to a request from the panel unit 12000. The advertisement management server 13000 includes a control unit 13100, an advertisement radiation DB unit 13200, and a tag applet DB unit 13300. The configuration of the advertisement management server 13000 will be described in detail below with reference to the accompanying drawings.

Figure 2:
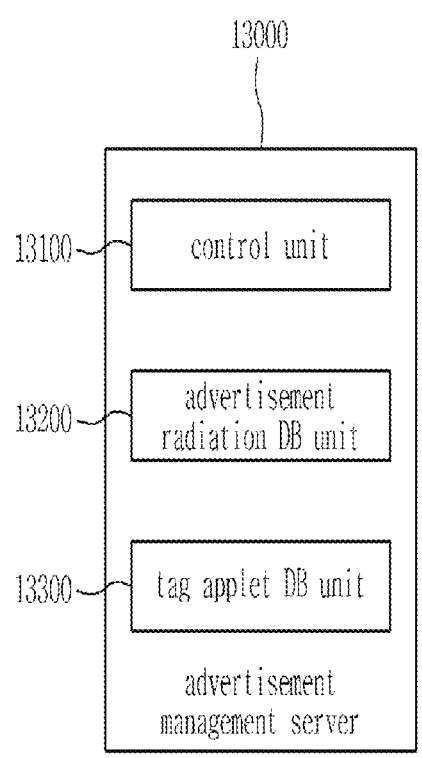
FIG. 2 is a detailed functional block diagram illustrating the configuration of an advertisement management server according to an embodiment of the present invention.

FIG. 2 is a detailed functional block diagram illustrating the configuration of an advertisement management server 13000 according to an embodiment of the present invention.

Referring to FIG. 2, the advertisement management server 13000 will now be described in detail. The control unit 13100 controls and monitors the advertisement radiation DB unit 13200 and the tag applet DB unit 13300 so that created or retrieved advertisement media can be delivered in real time when a signal requesting the provision of a tag applet including selected advertisement media is received from the panel unit 12000.

When the advertisement radiation DB unit 13200 is controlled by the control unit 13100 so that the advertisement radiation DB unit 13200 generates advertisement media in real time, the advertisement radiation DB unit 13200 may receive a multimedia signal from the outside and then create a new advertisement medium in real time, may create a new advertisement medium using a multimedia signal received from the outside and an advertisement medium retrieved in real time, or may create a new advertisement medium using a plurality of retrieved advertisement media in real time.

The advertisement radiation DB unit 13200 may record the advertisement medium, created in real time, in its own assigned area, and search for and reuse it later.

Furthermore, under the control of the control unit 13100, the tag applet DB unit 13300 creates a tag applet, which matches the advertisement medium created by the advertisement radiation DB unit 13200, and at the same time transmits it to the advertisement radiation DB unit 13200 and records it in its own assigned area.

Here, the tag applet is described as being an application program which enables a counterparty to receive an advertisement medium which is created and radiated using an NFC wireless method.

The control unit 13100 controls the advertisement radiation DB unit 13200, so that a created or retrieved advertisement medium is read. The control unit 13100 controls the tag applet DB unit 13300 so that a tag applet which is matched to the advertisement medium is newly created or a corresponding retrieved tag applet is applied to the advertisement radiation DB unit 13200.

That is, according to an embodiment of the present invention, when the advertisement radiation DB unit 13200 creates a new advertisement medium, a new tag created by the tag applet DB unit 13300 is used. In contrast, when the advertisement radiation DB unit 13200 retrieves an existing recorded advertisement medium, an existing tag applet recorded in the tag applet DB unit 13300 is retrieved and used.

The advertisement radiation DB unit 13200 completes provision by transmitting the created and retrieved advertisement medium and the corresponding tag applet to the panel unit 12000 in real time under the control and monitoring of the control unit 13100.

Figure 3:
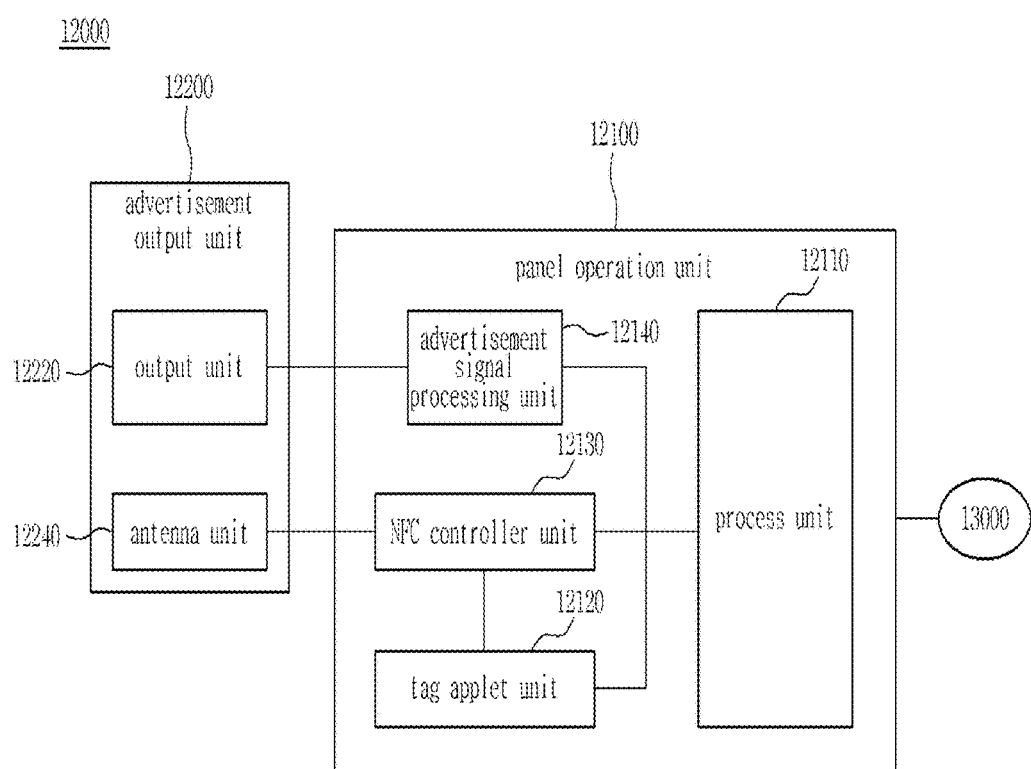
FIG. 3 is a detailed functional block diagram illustrating the configuration of a panel unit according to a first embodiment of the present invention.

FIG. 3 is a detailed functional block diagram illustrating the configuration of a panel unit 12000 according to a first embodiment of the present invention.

Referring to FIG. 3, the panel unit 12000 will now be described in detail. The panel unit 12000 according to the first embodiment includes a panel operation unit 12100, and an advertisement output unit 12200.

The panel operation unit 12100 includes a process unit 12110, a tag applet unit 12120, an NFC controller unit 12130, and an advertisement signal processing unit 12140. The advertisement output unit 12200 includes an output unit 12220, and an antenna unit 12240.

Here, the output unit 12220 and antenna unit 12240 of the advertisement output unit 12200 form a pair so that they output and radiate signals of the same content while operating in conjunction with each other.

That is, the output unit 12220 and the antenna unit 12240 which constitute the advertisement output unit 12200 output or radiate an advertisement medium of the same content, form a pair, and have corresponding paths over which data of the same content is transmitted.

The process unit 12110 which constitutes a part of the panel operation unit 12100 receives a corresponding tag applet matched to the advertisement media from the advertisement management server 13000, records it in the assigned area of the tag applet unit 12120, and applies it to the NFC controller unit 12130 and the advertisement signal processing unit 12140.

The NFC controller unit 12130 outputs a designated advertisement medium to the antenna unit 12240 via a corresponding path in the form of data under the control and monitoring of the process unit 12110.

Furthermore, the advertisement signal processing unit 12140 outputs a designated advertisement medium to the output unit 12220 via a corresponding path in the form of a multimedia signal under the control and monitoring of the process unit 12110.

The advertisement output unit 12200 outputs one or more designated advertisement media under the control of the panel operation unit 12100. It is apparent that when a plurality of advertisements are output, different advertisement media are output and radiated at different times.

In the configuration according to the first embodiment of the present invention, a selected advertisement medium is output through the output unit 12220 in the form of a multimedia signal, and, when the mobile terminal 11000 tags the antenna unit 12240, an advertisement medium of content which is the same as the content of the advertisement medium output through the output unit 12220 is provided in the form of data.

Accordingly, the mobile terminal 11000 receives the advertisement medium, which output through the output unit 12220, in the form of data by tagging the antenna unit 12240 and then records it in its own memory area, so that there are the advantages of repeatedly viewing and/or listening to the corresponding advertisement medium ubiquitously and analyzing it over time.

In particular, there is the advantage of reviewing or comparing and analyzing the content of the advertisement media (or media) when the content of an advertisement is summarized or the time tables of a movie or the prices of a product are compared with each other.

Figure 4:
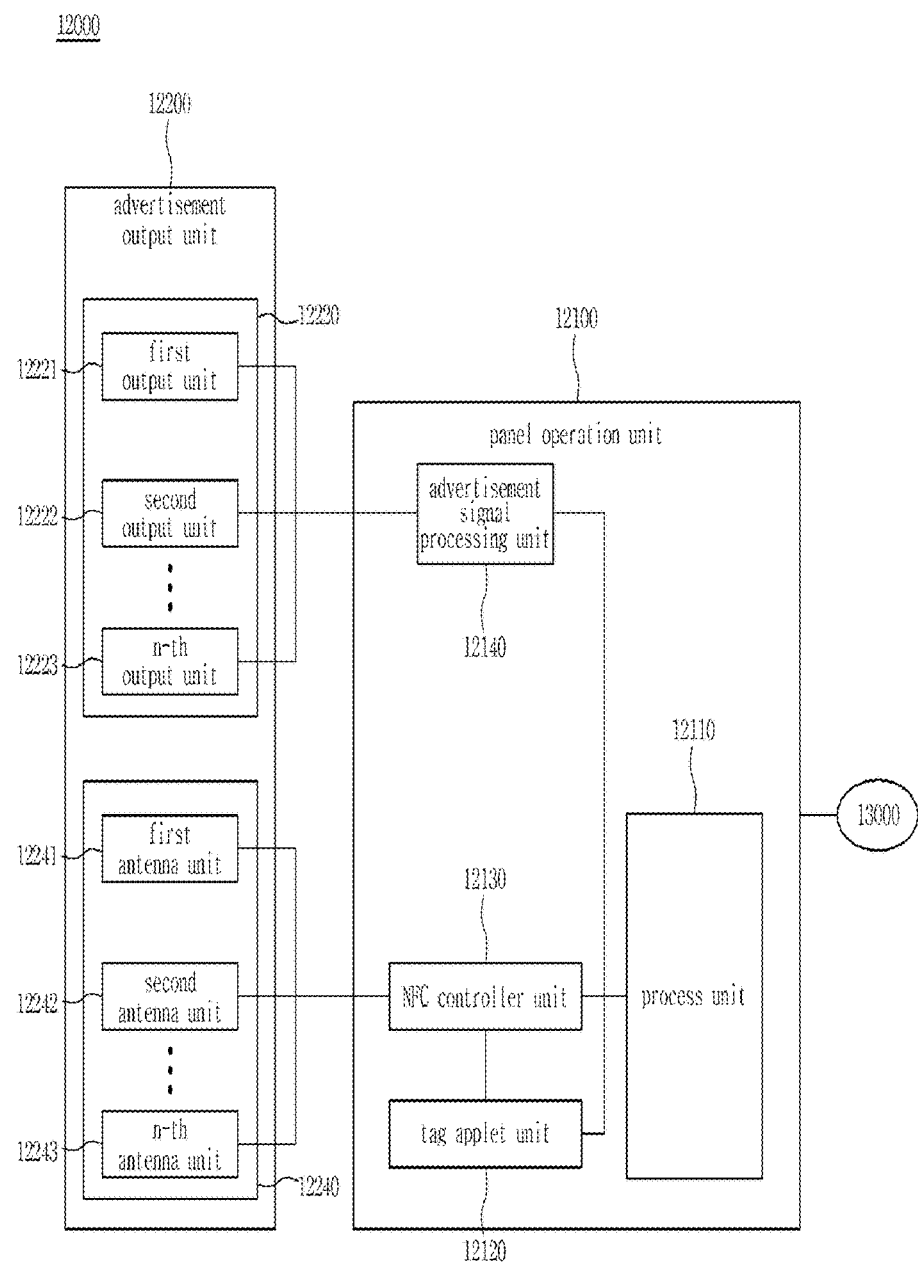
FIG. 4 is a detailed functional block diagram illustrating the configuration of a panel unit according to a second embodiment of the present invention.

FIG. 4 is a detailed functional block diagram illustrating the configuration of a panel unit 12000 according to a second embodiment of the present invention.

Referring to FIG. 4, the panel unit 12000 will now be described in detail. The panel unit 12000 according to the second embodiment includes a panel operation unit 12100, and an advertisement output unit 12200.

The panel operation unit 12100 includes a process unit 12110, a tag applet unit 12120, an NFC controller unit 12130, and an advertisement signal processing unit 12140. The advertisement output unit 12200 includes an output unit 12220 including first to n-th output units 12221, 12222, . . . , and 12223, and an antenna unit 12240 including first to n-th antenna units 12241, 12242, . . . , and 12243.

In an embodiment, the first output unit 12221 and the first antenna unit 12241 form a pair, the second output unit 12222 and the second antenna unit 12242 form a pair, . . . , and the n-th output unit 12223 and the n-th antenna unit 12243 form a pair.

The output unit 12220 and the antenna unit 12240 paired as described above output an advertisement medium of the same content via a corresponding path of each pair.

Since the process unit 12110 and tag applet unit 12120 of the panel operation unit 12100 are the same as those of the first embodiment, a description thereof is omitted to avoid a redundant description.

The NFC controller unit 12130 may separately manage the paths of the plurality of antenna units 12241, 12242, . . . , and 12243 which constitute the antenna unit 12240, and performs control so that the plurality of antenna units 12241, 12242, . . . , and 12243 output and radiate corresponding tag applets and so that when it is determined that the mobile terminal 11000 has performed tagging or tag reading on one of the antenna units 12241, 12242, . . . , and 12243, a matched corresponding advertisement medium is output in the form of data, thus being radiated via the corresponding antenna unit 12241, 12242 . . . , or 12243.

Furthermore, the advertisement signal processing unit 12140 may separately manage the paths of the plurality of output units 12221, 12222 . . . , and 12223 which constitute the output unit 12220, and performs control so that a corresponding advertisement medium is output in the form of a multimedia signal.

Here, the NFC controller unit 12130 and the advertisement signal processing unit 12140 are synchronized with each other and output information corresponding to an advertisement medium of the same content over a path to which a pair of the synchronized output unit 12220 and antenna unit 12240 of the advertisement output unit 12200 are connected.

The configuration of the embodiment of the present invention has the advantage of selectively or simultaneously outputting one or more advertisements selected from among a plurality of a variety of advertisements using a single advertisement medium.

Figure 5:
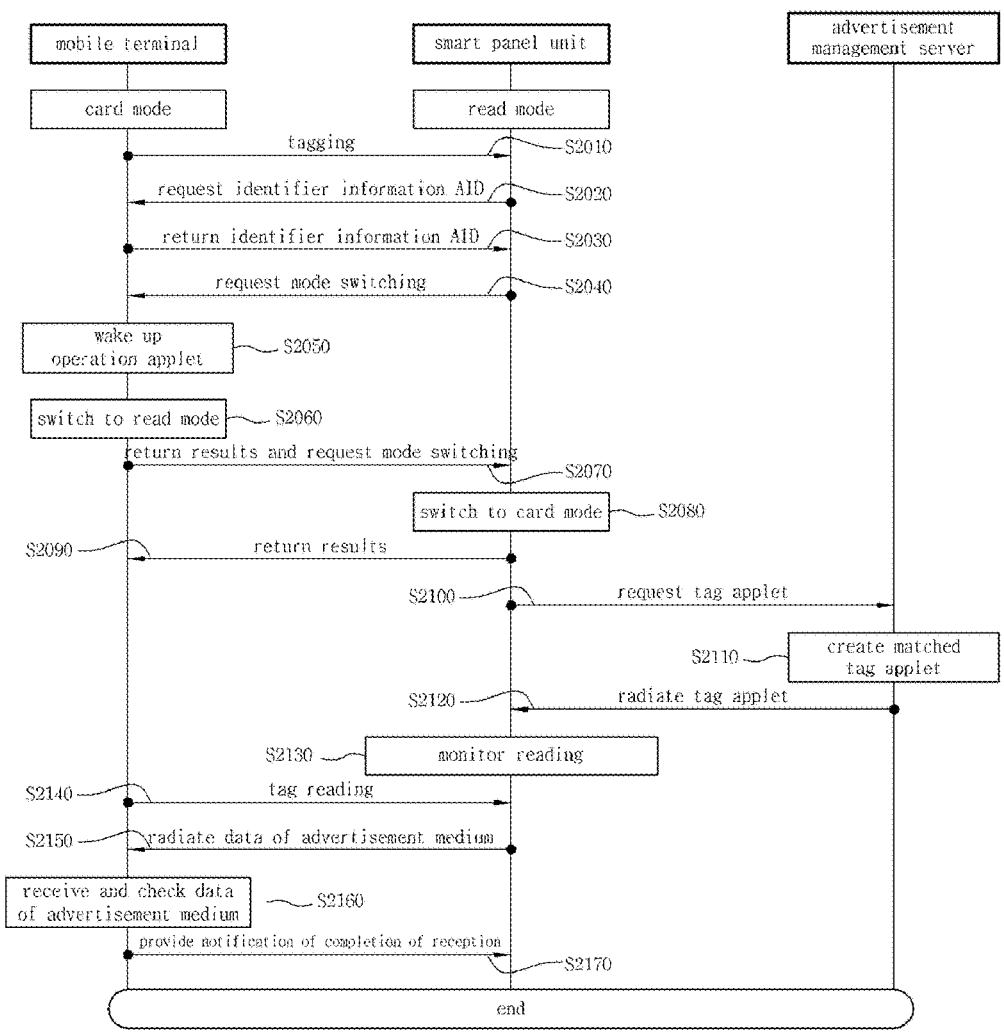
FIG. 5 is a flowchart illustrating a process of operating the advertisement information provision system according to an embodiment of the present invention.

FIG. 5 is a flowchart illustrating a process of operating the advertisement information provision system according to an embodiment of the present invention.

Referring to FIG. 5, the process of operating the advertisement information provision system according to the embodiment of the present invention will now be described in detail. The mobile terminal operates in card mode in its initial stage, the panel unit operates in read mode in its initial stage, and the panel unit outputs an advertisement medium in the form of a multimedia signal and also outputs a tag applet matched to the advertisement medium in the form of data in accordance with the first or second embodiment.

Card mode is described as being the state of providing recorded information to a counterparty, while read mode is described as being the state of reading the information of a counterparty.

When a user desires to download the content of an advertisement medium currently being advertised in order to repeatedly play back or analyze the content of the advertisement medium output by an output unit of the panel unit, the mobile terminal tags a corresponding antenna unit which is paired with the output unit at step S2010.

The panel unit issues a request to the mobile terminal that it search for corresponding applet identifier (AID) and make a response at step S2020 in order to check whether a corresponding operation applet capable of receiving the advertisement medium has been recorded in the mobile terminal.

The mobile terminal searches for the corresponding AID information and then returns information about retrieved corresponding ID in response to the request from the panel unit at step S2030. In this case, the panel unit requests mode-switching from the mobile terminal at step S2040. The request for mode-switching is to request that the mobile terminal switches to read mode and operates in read mode.

When the mobile terminal receives a mode-switching request signal from the panel unit, the mobile terminal wakes up a corresponding operation applet so that it is activated to receive the advertisement medium at step S2050, and is automatically switched from the current card mode to read mode at step S2060.

That is, the mobile terminal automatically switches from current card mode to read mode, and at the same time notifies the panel unit of the mode-switching and requests that the panel unit automatically switch its operating mode from read mode to card mode at step S2070.

The panel unit switches the current operating mode of the mobile terminal from read mode back to card mode in response to the response and the request at step S2080, and returns the results of the automatic mode-switching to the card mode to the mobile terminal at step S2090.

Furthermore, the panel unit requests to the advertisement management server a tag applet capable of downloading an advertisement medium matched to the tagged antenna unit and the corresponding advertisement medium from the advertisement management server at step S2100, and the advertisement management server creates or searches for the requested advertisement medium and the matched tag applet in real time at step S2110, and transmits and provides the advertisement medium retrieved or created in real time to the panel unit at step S2120.

The panel unit checks the advertisement medium and the matched tag applet for errors while receiving the advertisement medium and the matched tag applet provided by the advertisement management server, records the received advertisement medium and matched tag applet in the assigned memory area of the tag applet unit if they have been received without any error, and monitors whether the mobile terminal performs tagging for reading at step S2130.

In this case, if the corresponding advertisement medium and matched tag applet have been already recorded in the memory area of the tag applet unit, the panel unit may not request transmission from the advertisement management server.

When the panel determines that the mobile terminal is in a tag reading state so that it can read the advertisement medium in the form of data at step S2140, the panel unit transmits the matched tag applet and the corresponding advertisement medium to the mobile terminal via the tagged corresponding antenna unit in the form of data at step S2150.

The mobile terminal checks whether the data of the advertisement medium has been received without any error using the received tag applet at step S2160, and, if the overall data of the advertisement medium has been received without any error, the mobile terminal returns a reception completion signal to the panel unit at step S2170.

Figure 6:
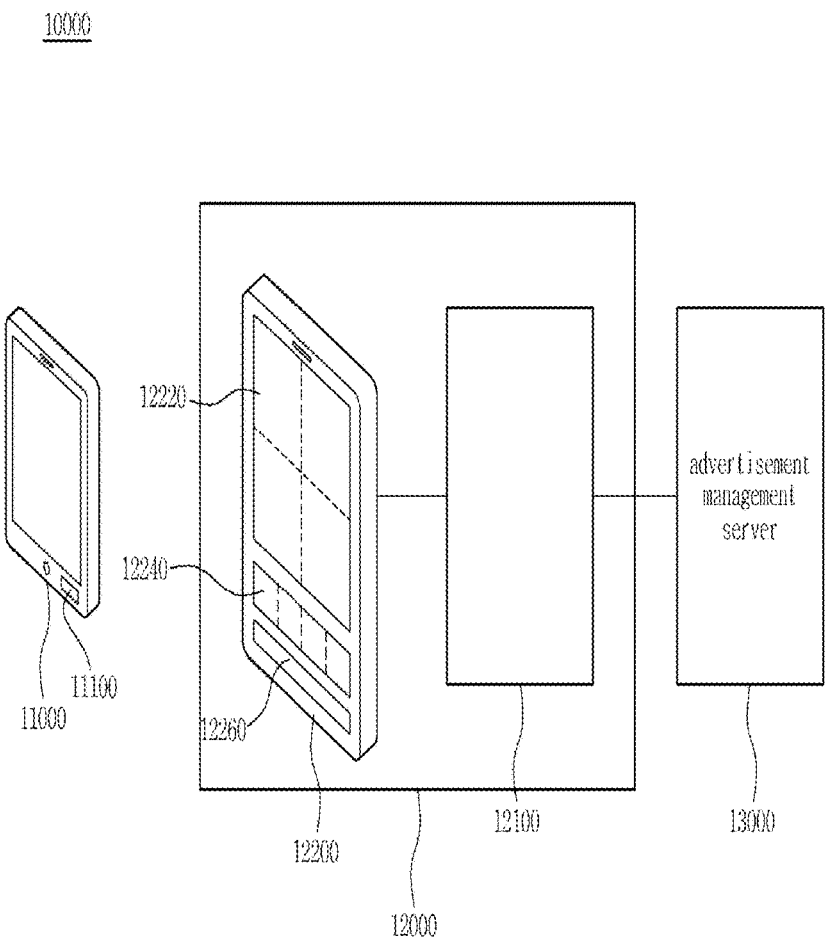
FIG. 6 is a functional block diagram illustrating the configuration of an advertisement information provision system according to another embodiment of the present invention.

FIG. 6 is a functional block diagram illustrating the configuration of an advertisement information provision system 10000 according to another embodiment of the present invention.

Referring to FIG. 6, the advertisement information provision system 10000 will now be described in detail. The advertisement information provision system 10000 includes a mobile terminal 11000, a panel unit 12000, and an advertisement management server 13000.

Since the advertisement information provision system illustrated in FIG. 6 is similar to that illustrated in FIG. 1, descriptions of differences therebetween will now be mainly provided.

The mobile terminal 11000 has the functionality of immediately and wirelessly connecting to and communicating with a desired counterparty ubiquitously while moving, like the mobile terminal illustrated in FIG. 1. The mobile terminal 11000 further includes a scanner unit 1110 which is capable of reading a barcode and a QR code by scanning them.

Here, the barcode and the QR code are described as being output by the panel unit 12000. The scanner unit 1110 may include one or more which are selected from among a configuration for optically scanning a barcode and a QR code and a configuration for wireless receiving them.

The panel unit 12000 includes a panel operation unit 12100 and an advertisement output unit 12200, like the panel unit illustrated in FIG. 1.

The panel operation unit 12100 includes a QR code analysis unit 12150 and a barcode analysis unit 12160. The advertisement output unit 12200 includes a code radiation unit 12260.

The QR code analysis unit 12150 and the barcode analysis unit 12160 apply the QR code or barcode to the NFC controller unit 12130 under the control of the process unit 12110. The NFC controller unit 12130 applies the QR code or barcode to the code radiation unit 12260 of the advertisement output unit 12200, so that the QR code or barcode can be transmitted.

Here, according to an embodiment of the present invention, the code radiation unit 12260 may include a display unit which visually displays a QR code or barcode. The code radiation unit may perform wireless output.

The configuration of the panel unit 12000 will be described in detail later with reference to the accompanying drawing and an embodiment.

The advertisement management server 13000 includes a control unit 13100, an advertisement radiation DB unit 13200, a tag applet DB unit 13300, like the advertisement management server illustrated in FIG. 1, and further includes an advertisement tag applet unit 13400, a QR code tag applet unit 13500, and a barcode tag applet unit 13600.

The advertisement management server 13000 will be described in detail below with reference to the accompanying drawing.

Figure 7:
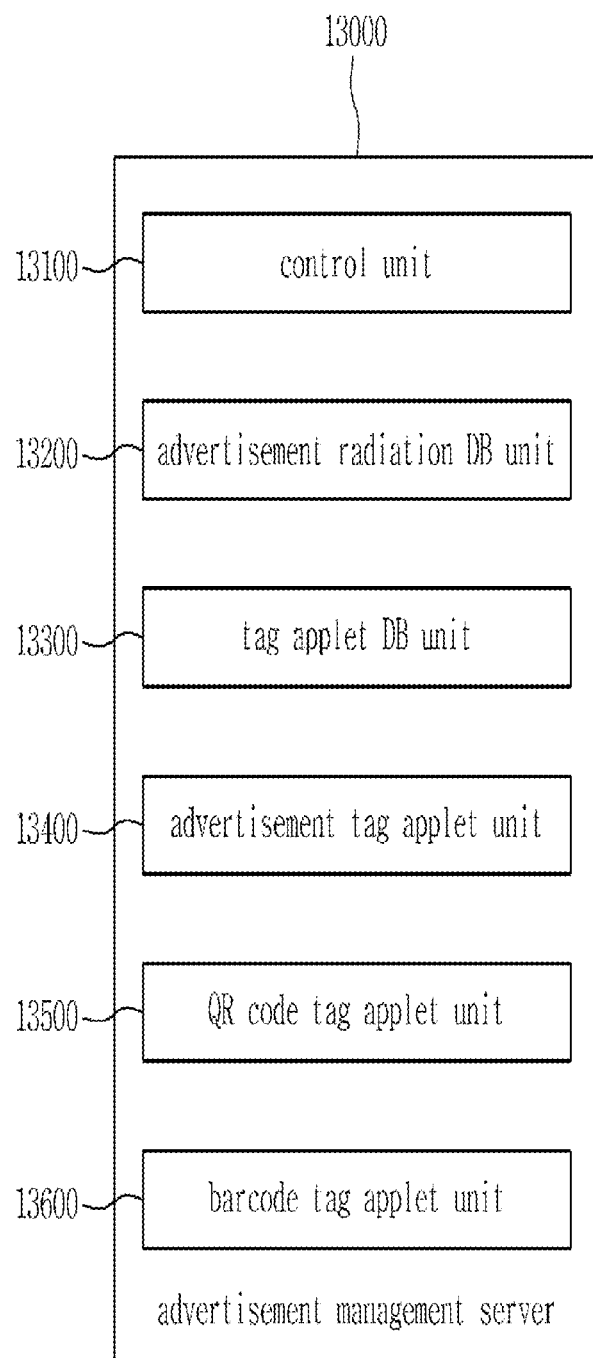
FIG. 7 is a detailed functional block diagram illustrating the configuration of an advertisement management server according to another embodiment of the present invention.

FIG. 7 is a detailed functional block diagram illustrating the configuration of an advertisement management server 13000 according to another embodiment of the present invention.

Referring to FIG. 7, the advertisement management server 13000 will now be described in detail. The advertisement management server 13000 includes a control unit 13100, an advertisement radiation DB unit 13200, a tag applet DB unit 13300, an advertisement tag applet unit 13400, a QR code tag applet unit 13500, and a barcode tag applet unit 13600.

Since the configuration and operation of the control unit 13100 and the advertisement radiation DB unit 13200 are the same as those illustrated in FIG. 2, redundant descriptions thereof will not be given here.

The tag applet DB unit 13300 records all tag applets, being created or created by the advertisement management server 13000, under the control and monitoring of the control unit 13100. A tag applet selected by searching may be reused.

The advertisement tag applet unit 13400 creates a tag applet which matches the advertisement media created by the advertisement radiation DB unit 13200, and then transmits the tag applet to the tag applet DB unit 13300, under the control of the control unit 13100.

Here, the tag applet is described as being an application program which enables a counterparty to receive an advertisement media which is created and then transmitted via an NFC wireless connection.

The QR code tag applet unit 13500 creates a QR code tag applet under the control of the control unit 13100, and the barcode tag applet unit 13600 creates a barcode tag applet under the control of the control unit.

The QR code tag applet and the barcode tag applet created by the QR code tag applet unit 13500 and the barcode tag applet unit 13600, respectively, are applied to the advertisement radiation DB unit 13200, and then transmitted to the panel unit 12000, under the control of the control unit 13100.

Figure 8:
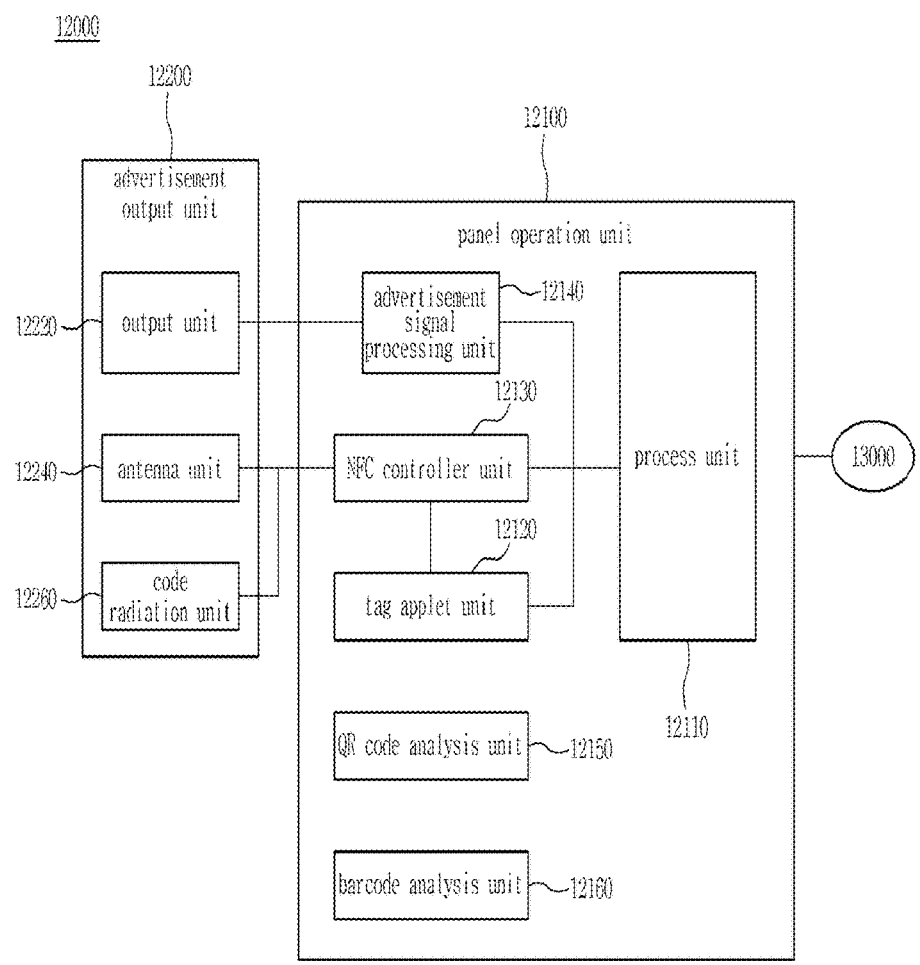
FIG. 8 is a detailed functional block diagram illustrating the configuration of a panel unit according to a third embodiment of the present invention.

FIG. 8 is a detailed functional block diagram illustrating the configuration of a panel unit 12000 according to a third embodiment of the present invention.

Referring to FIG. 8, the panel unit 12000 according to the third embodiment of the present invention will now be described in detail. The panel unit 12000 according to the third embodiment includes a panel operation unit 12100, and an advertisement output unit 12200, like that according to the first embodiment.

The panel operation unit 12100 includes a process unit 12110, a tag applet unit 12120, an NFC controller unit 12130, an advertisement signal processing unit 12140, a QR code analysis unit 12150, and a barcode analysis unit 12160. The advertisement output unit 12200 includes an output unit 12220, an antenna unit 12240, and a code radiation unit 12260.

Here, since the process unit 12110, tag applet unit 12120, NFC controller unit 12130 and advertisement signal processing unit 12140 of the panel operation unit 12100 and the output unit 12220 and antenna unit 12240 of the advertisement output unit 12200 are the same as those of the first embodiment, redundant descriptions thereof will be omitted here.

The QR code analysis unit 12150 analyzes a received QR code or outputs a created QR code to the advertisement output unit 12200 via the NFC controller unit 12130 under the control and monitoring of the process unit 12110.

The barcode analysis unit 12160 analyzes a received barcode or outputs a created barcode to the advertisement output unit 12200 via the NFC controller unit 12130 under the control and monitoring of the process unit 12110.

The code radiation unit 12260 radiates an applied QR code or barcode via the NFC controller unit 12130.

The configuration according to the embodiment of the present invention has the advantage of outputting QR code or barcode while outputting a single advertisement medium or outputting a plurality of advertisement media at different times.

Figure 9:
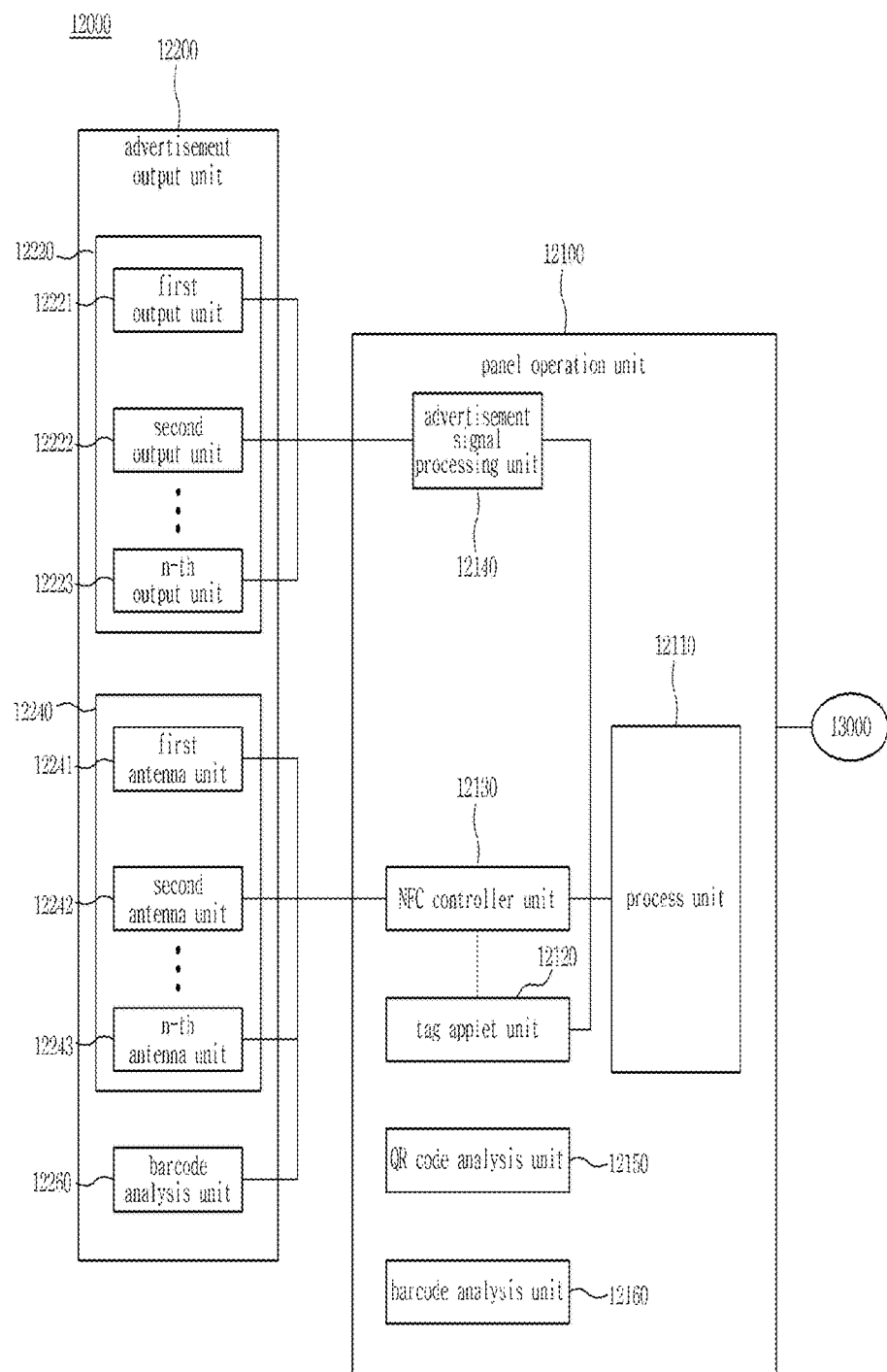
FIG. 9 is a detailed functional block diagram illustrating the configuration of a panel unit according to a fourth embodiment of the present invention.

FIG. 9 is a detailed functional block diagram illustrating the configuration of a panel unit 12000 according to a fourth embodiment of the present invention.

Referring to FIG. 9, the panel unit 12000 according to the fourth embodiment of the present invention 12000 will now be described in detail. The panel unit 12000 according to the fourth embodiment includes a panel operation unit 12100 and an advertisement output unit 12200, like that of the second embodiment.

Since the process unit 12110, tag applet unit 12120, NFC controller unit 12130 and advertisement signal processing unit 12140 of the panel operation unit 12100 have same configurations and operations as those of the second embodiment and the QR code analysis unit 12150 and barcode analysis unit 12160 of the panel operation unit 12100 have same configurations and operations as those of the third embodiment, redundant descriptions thereof will not be given here.

Furthermore, since the output unit 12220 and antenna unit 12240 of the advertisement transmission unit 12200 have the same configurations and operations as those of the second embodiment and the code radiation unit 12260 of the advertisement transmission unit 12200 have the same configurations and operations as those of the third embodiment, redundant descriptions thereof will not be given here.

A barcode is a linear one-dimensional (1D) code which is formed by combining a plurality of white and black bars having different widths and can be easily read by a computer, and is widely used to record information about the name, management number, release date, expiration date and price of a commodity.

A QR (Quick Response) code is a matrix-type two-dimensional (2D) code which is formed by arranging small square dots equally in lateral and vertical directions and can be read by a computer. A QR code may have on its each side dots the number of which ranges from 21 to 177, can record a maximum of 23,648 bits, can be recovered thanks to its supplementary property when part of its data is damaged, and can be recognized or read in all directions of 360 degrees. That is, QR codes can record larger amounts of information than barcodes, and may include link information.

The current QR code is a 2D code technology develop and released by a company, and new-types of 2D code technologies may be developed by other companies in other forms.

The tagging or tag is described as being the state of recognizing the electrical data of a counterparty near the counterparty without electrically direct contact.

The NFC mobile terminal includes a plurality of application programs. Each of the application programs is referred to an applet. The application programs are identified by respective pieces of applet identifier (AID). Furthermore, the same applets may be assigned different pieces of applet identifier (AID) when their versions or manufacturers are different.

When a specific device including the NFC mobile terminal communicates with or operates in conjunction with a counterparty device in a one-to-one correspondence, they should include and operate the same applets having the same AID information.

Furthermore, the same applets having the same AID information may be divided into a main applet and a sub-applet. In the present invention, the main applet is referred to as a driving applet, and the sub-applet is referred to as a tag applet.

Therefore, NFC mobile terminals which operate with each other should include and operate the same applets, and therefore should have the same AID information.

Communication mode in which signals are transmitted and received using an NFC method includes card mode and read mode. The card mode is described as being mode in which recorded information signals are provided to a counterparty, and the read mode is described as being mode in which information signals recorded in a counterparty are read.

In the present invention, content is described as being digital data information including one or more of media such as a character(s), a still image(s), a moving image(s), image(s), and sound(s), and multimedia is described as being an output including one or more of a sound(s), a moving image(s), a still image(s), and a character(s).

Furthermore, commodity information is described as including the advertisement information, characteristic information, expiration date, use, price, etc. of a corresponding commodity.

Figure 10:
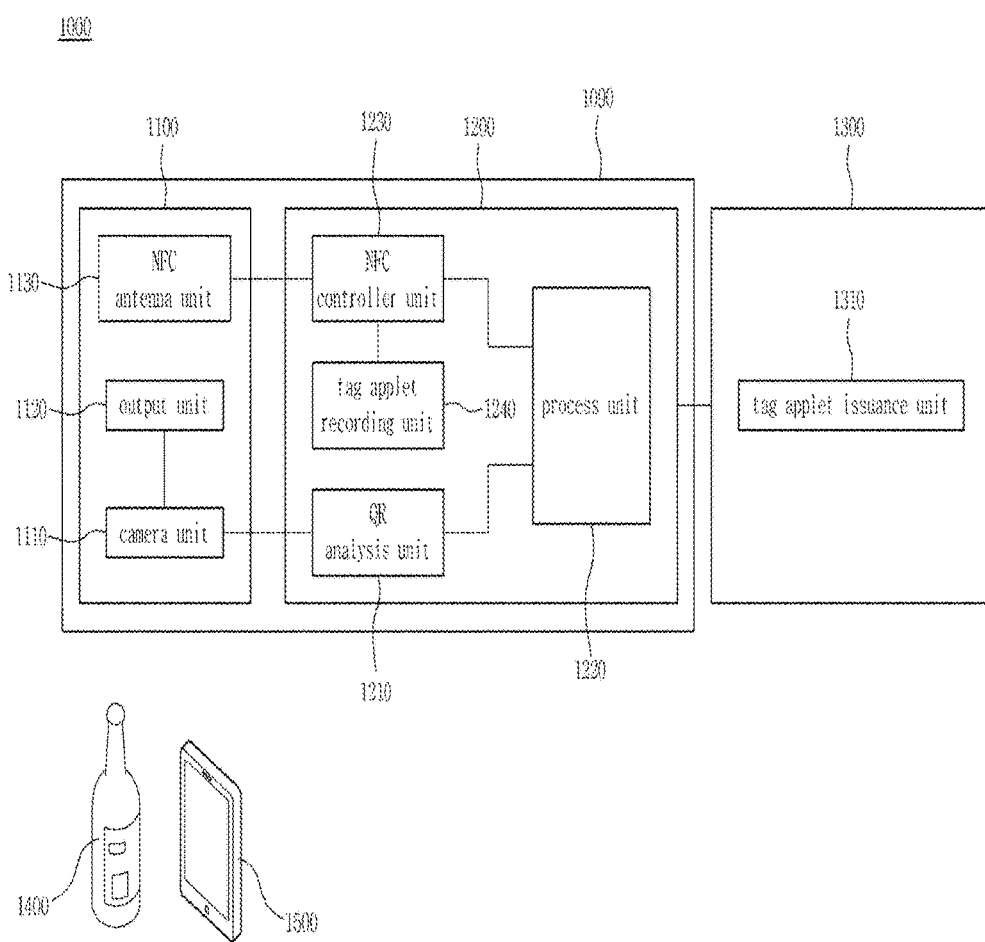
FIG. 10 is a functional block diagram illustrating the configuration of a commodity information provision system according to a fifth embodiment of the present invention.

FIG. 10 is a functional block diagram illustrating the configuration of a commodity information provision system 1000 according to a fifth embodiment of the present invention.

Referring to FIG. 10, the commodity information provision system 1000 according to the fifth embodiment of the present invention will now be described in detail. The commodity information provision system 1000 includes an apparatus unit 1090 including a panel unit 1100 and an operation unit 1200 and a server unit 1300.

The apparatus unit 1090 includes the panel unit 1100 and the operation unit 1200, and may be one selected from among a NFC reader and a mobile terminal, which is the same throughout the following description.

The panel unit 1100 may include a camera unit 1110, an output unit 1120, and an NFC antenna unit 1130. The operation unit 1200 may include a QR analysis unit 1210, a process unit 1220, an NFC controller unit 1230, and a tag applet recording unit 1240. The server unit 1300 may include a tag applet issuance unit 1310.

The camera unit 1110 includes a camera which captures an image of an optical code (including, for example, a QR code) which is represented on a commodity 1400.

The output unit 1120 outputs and displays an image, captured by the camera unit 1110, so that the image can be visually checked or viewed. Here, according to an embodiment of the present invention, it may be checked whether such an optical code has been accurately scanned or captured by the camera unit 1110, using the output unit 2120.

According to an embodiment of the present invention, the NFC antenna unit 1130 is configured to be turned to a wireless frequency in the 13.56 MHz band, and wirelessly transmits and receives NFC signals.

The QR analysis unit 1210 receives the optical code captured by the camera unit 1110, recognizes and analyzes a QR code, and converts the QR code into commodity data.

The commodity data recognized, analyzed and obtained using the QR code includes a variety of information such as the name, manufacturer, management number, release date, expiration date, price, features, use and advertisement information of a commodity 1400, and may further include link information.

The process unit 1220 monitors and controls the functional units of the panel unit 1100 and the operation unit 1200, receives the commodity data from the QR analysis unit 1210, and outputs the commodity data to the server unit 1300.

Furthermore, the process unit 1220 receives a tag applet provided by the server unit 1300, and applies the tag applet to the NFC controller unit 1230.

The NFC controller unit 1230 operates in NFC read mode in its initial stage, and records information about the tag applet, provided by the process unit 1220, in the assigned area of the tag applet recording unit 1240.

The NFC controller unit 1230 monitors the NFC antenna unit 1130 of the panel unit 1100, and detects the tagging of the NFC mobile terminal 1500.

When the NFC controller unit 1230 detects the tagging of the NFC mobile terminal 1500, it requests applet identifier (AID), requests that mode-switching is automatically performed, and receives a response signal indicative of corresponding results.

Once the NFC controller unit 1230 has received the response signal, it is automatically switched from read mode to card mode, and outputs a tag applet recorded in the tag applet recording unit 1240, thereby transmitting the tag applet to the NFC mobile terminal 1500 via the NFC antenna unit 1130.

In this case, when the NFC controller unit 1230 receives a response indicative of the normal reception of the tag applet without transmission error from the NFC mobile terminal 1500, it deletes the corresponding tag applet recorded in the tag applet recording unit 1240. That is, the information of the tag applet is allowed to be provided only once.

The server unit 1300 includes the tag applet issuance unit 1310, receives the commodity data provided by the operation unit 1200, converts the commodity data into a tag applet using the tag applet issuance unit 1310, and transmits the tag applet to the operation unit 1200.

The commodity 1400 may be any type of commodity, and an optical code may be represented, for example, on the surface of the commodity 1400.

The NFC mobile terminal 1500 connects to the mobile communication system, and communicates with a desired counterparty via a wireless connection. The NFC mobile terminal 1500 may include an NFC communication function and then perform NFC communications. Alternatively, the NFC mobile terminal 1500 may include only an NFC communication function.

The NFC mobile terminal 1500 includes a plurality of application applets including a driving applet, and these applets are identified by respective pieces of AID information. The driving applet is described as being an application program which transmits and receives commodity information.

The NFC mobile terminal 1500 operates in card mode in its initial stage, receives a signal requesting AID information and a signal requesting mode-switching from the operation unit 1200 via the panel unit 1100, provides retrieved AID information, wakes up and operates a corresponding driving applet, performs switching to read mode, and returns a response signal indicative of results corresponding to a request signal to the operation unit 1200 via the panel unit 1100.

After the NFC mobile terminal 1500 has been automatically switched to read mode, the NFC mobile terminal 1500 receives a tag applet from the operation unit 1200, and outputs the tag applet via its own output unit using an operating driving applet in the form of multimedia.

The configuration according to the fifth embodiment of the present invention converts commodity information recorded in a QR code or an optical code represented on the surface of a commodity into a tag applet and transfers the tag applet to the NFC mobile terminal, and the NFC mobile terminal receives the tag applet using an NFC method and outputs the commodity information using a waked driving applet in the form of multimedia content.

Figure 11:
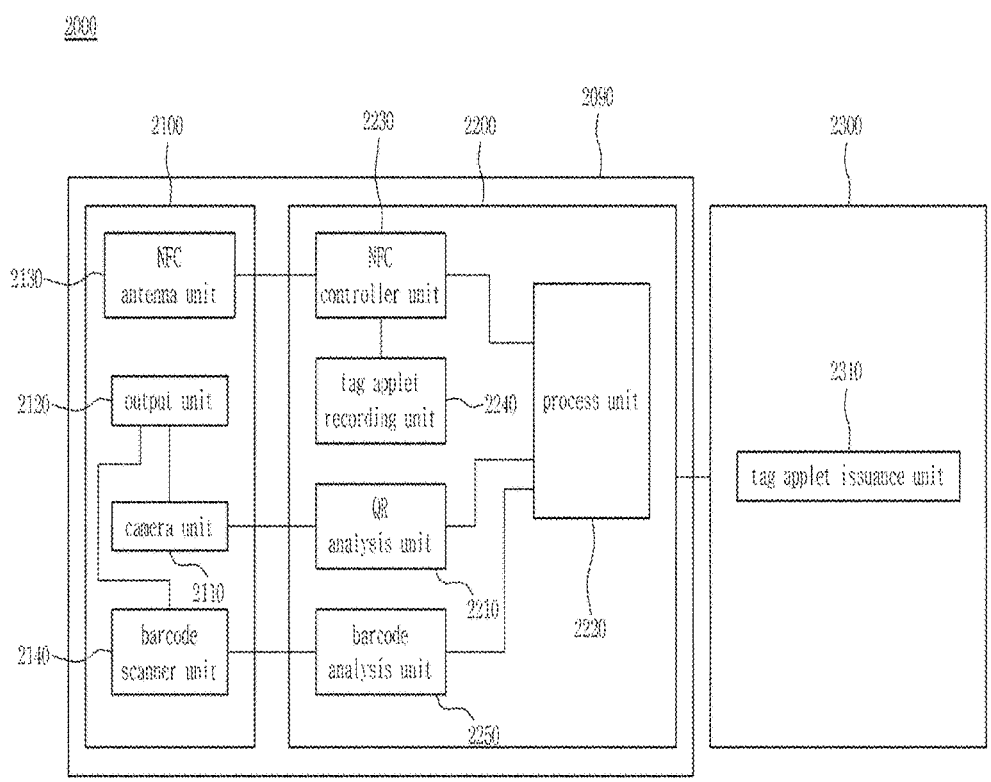
FIG. 11 is a functional block diagram illustrating the configuration of a commodity information provision system according to a sixth embodiment of the present invention.

FIG. 11 is a functional block diagram illustrating the configuration of a commodity information provision system according to a sixth embodiment of the present invention.

Referring to FIG. 11, the commodity information provision system 2000 according to the sixth embodiment of the present invention will now be described in detail. The commodity information provision system 2000 according to the sixth embodiment of the present invention includes an apparatus unit 2090 including a panel unit 2100 and operation unit 2200 and a server unit 2300.

The apparatus unit 2090 includes the panel unit 2100 and the operation unit 2200, and may be any one of an NFC reader and a mobile terminal, which is the same throughout the following description.

The commodity information provision system 2000 according to the sixth embodiment is the same as the commodity information provision system 1000 of the fifth embodiment except that the commodity information provision system 2000 according to the sixth embodiment further includes a barcode scanner unit 2140 and a barcode analysis unit 2250 compared to the commodity information provision system 1000 of the fifth embodiment.

That is, since the configuration of the server unit 2300 including an output unit 2120, an NFC antenna unit 2130, a process unit 2220, an NFC controller unit 2230, a tag applet recording unit 2240, and a tag applet issuance unit 2310 is the same as that of the fifth embodiment except for reference numerals, redundant descriptions will be omitted and only necessary descriptions will be given.

Therefore, the configurations of the unique barcode scanner unit 2140 and barcode analysis unit 2250 will now be described in detail.

The camera unit 2110 captures a QR code, and applies the QR code to both the output unit 2120 and the QR analysis unit 2210. The barcode scanner unit 2140 scans a barcode, and applies the scanned image to both the output unit 2120 and the barcode analysis unit 2250.

The barcode and the QR code may be the same in the type and content of information to be recorded, and may be different in the amount of information which can be recorded therein.

That is, the barcode is a computer-readable 1D code, and can record a relatively limited amount of information because the amount of data which can be recorded in the barcode is small. The QR code is a computer-readable 2D code, and is widely used recently QR because it has the advantages of being able to record a maximum of 23,648 bits and also recording link information.

The configuration according to the sixth embodiment of the present invention converts commodity information recorded in optical codes including a barcode and a QR code represented on the surface of a commodity 1400 into a tag applet and transfers the tag applet to the NFC mobile terminal 1500, and the NFC mobile terminal 1500 receives the tag applet using an NFC method and outputs the commodity information using a waked driving applet in the form of multimedia content. The configuration according to the sixth embodiment is different from the configuration of the present invention in that the configuration according to the sixth embodiment uses both the barcode and the QR code.

Figure 12:
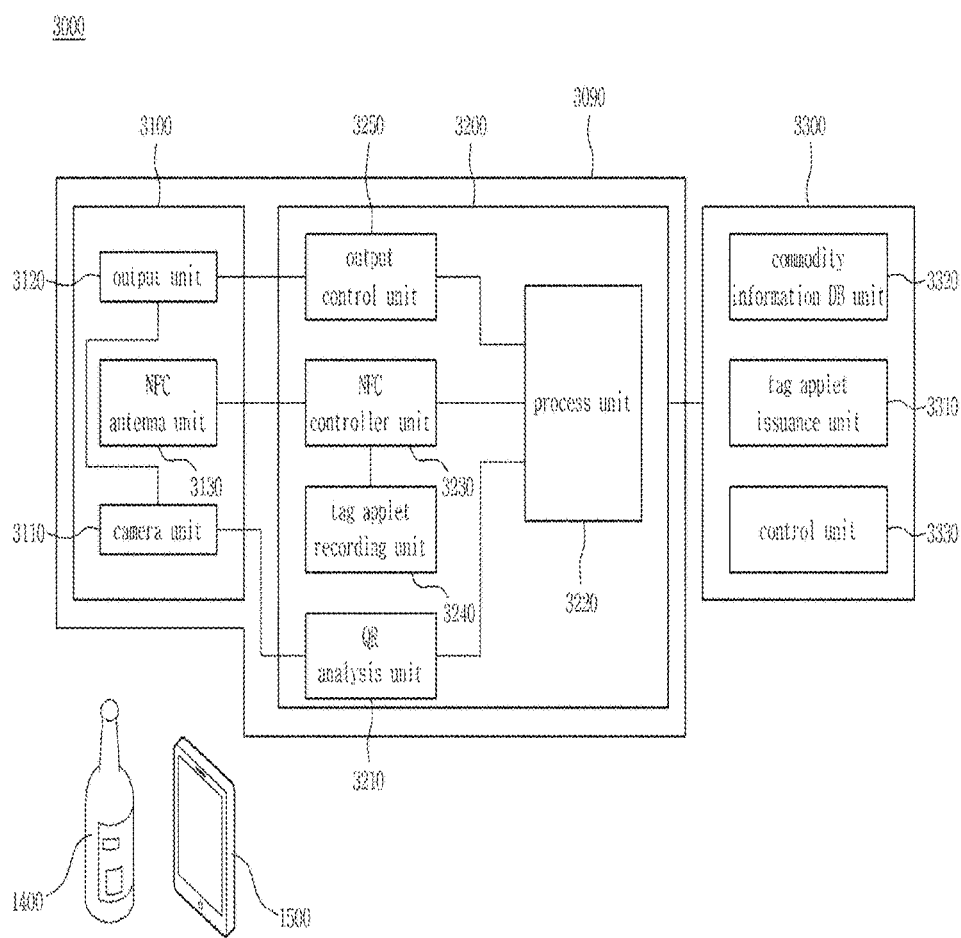
FIG. 12 is a functional block diagram illustrating the configuration of a commodity information provision system according to a seventh embodiment of the present invention.

FIG. 12 is a functional block diagram illustrating the configuration of a commodity information provision system 3000 according to a seventh embodiment of the present invention.

Referring to FIG. 12, the commodity information provision system 3000 according to the seventh embodiment of the present invention will now be described in detail. The commodity information provision system 3000 according to the seventh embodiment of the present invention includes an apparatus unit 3090 including a panel unit 3100 and an operation unit 3200 and a server unit 3300.

The apparatus unit 3090 includes the panel unit 3100 and the operation unit 3200, and may be any one selected from among an NFC reader and a mobile terminal, which is the same throughout the following description.

The commodity information provision system 3000 according to the seventh embodiment is the same as the commodity information provision system 1000 according to the fifth embodiment except that the output unit 3120 of the panel unit 3100 is connected to both a camera unit 3110 and the operation unit 3200, the operation unit 3200 further includes an output control unit 3250, and the server unit 3300 further includes a commodity information DB unit 3320 and a control unit 3330.

Since the other configurations of the commodity information provision system 3000 according to the seventh embodiment is the same as the commodity information provision system 1000 according to the fifth embodiment except for reference numerals, redundant descriptions will be omitted and only necessary descriptions will be given.

The output unit 3120 of the panel unit 3100 visually outputs video signals captured by the camera unit 3110, thereby allows whether the camera unit 3110 is accurately capturing an optical code to be checked, and also outputs a multimedia content signal selectively applied by the operation unit 3200.

The output control unit 3250 of the operation unit 3200 applies the tag applet, applied by the server unit 3300, to the output unit 3120 under the control of the process unit 3220, thereby allowing the output unit 3120 to be output in the form of a multimedia signal.

That is, the process unit 3220 provides the information of the tag applet, applied by the server unit 3300, to both the NFC controller unit 3230 and the output control unit 3250 at the same time.

The server unit 3300 receives the commodity data applied via the operation unit 3200, and applies the commodity data to the tag applet issuance unit 3310 and the commodity information DB unit 3320.

The tag applet issuance unit 3310 converts the commodity data, applied by the operation unit 3200, into a tag applet, as described in the descriptions of the fifth and sixth embodiments.

The commodity information DB unit 3300 analyzes the commodity data applied by the operation unit 3200, and, if link information is included in the commodity data, extracts the link information and connects to the corresponding link, thereby searching for and providing the corresponding commodity information.

The control unit 3330 performs control so that the corresponding commodity information found by the commodity information DB unit 3320 can be applied to the tag applet issuance unit 3310 and converted into a tag applet. In this case, the control unit 3330 performs control and monitoring so that the commodity information is converted into a tag applet which matches commodity data included in an optical code.

The server unit 3300 provides the tag applet, issued and created by the tag applet issuance unit 3310, to the process unit 3220 of the operation unit 3200.

The configuration according to the seventh embodiment of the present invention converts commodity information, recorded in a QR code or an optical code represented on the surface of a commodity, into a tag applet, transfers the tag applet to the NFC mobile terminal, and also searches for and includes more commodity information linked using link information, thereby transferring the matched tag applet to the NFC mobile terminal. The NFC mobile terminal receives the tag applet using an NFC method, and outputs commodity information using a waked driving applet in the form of multimedia content.

Figure 13:
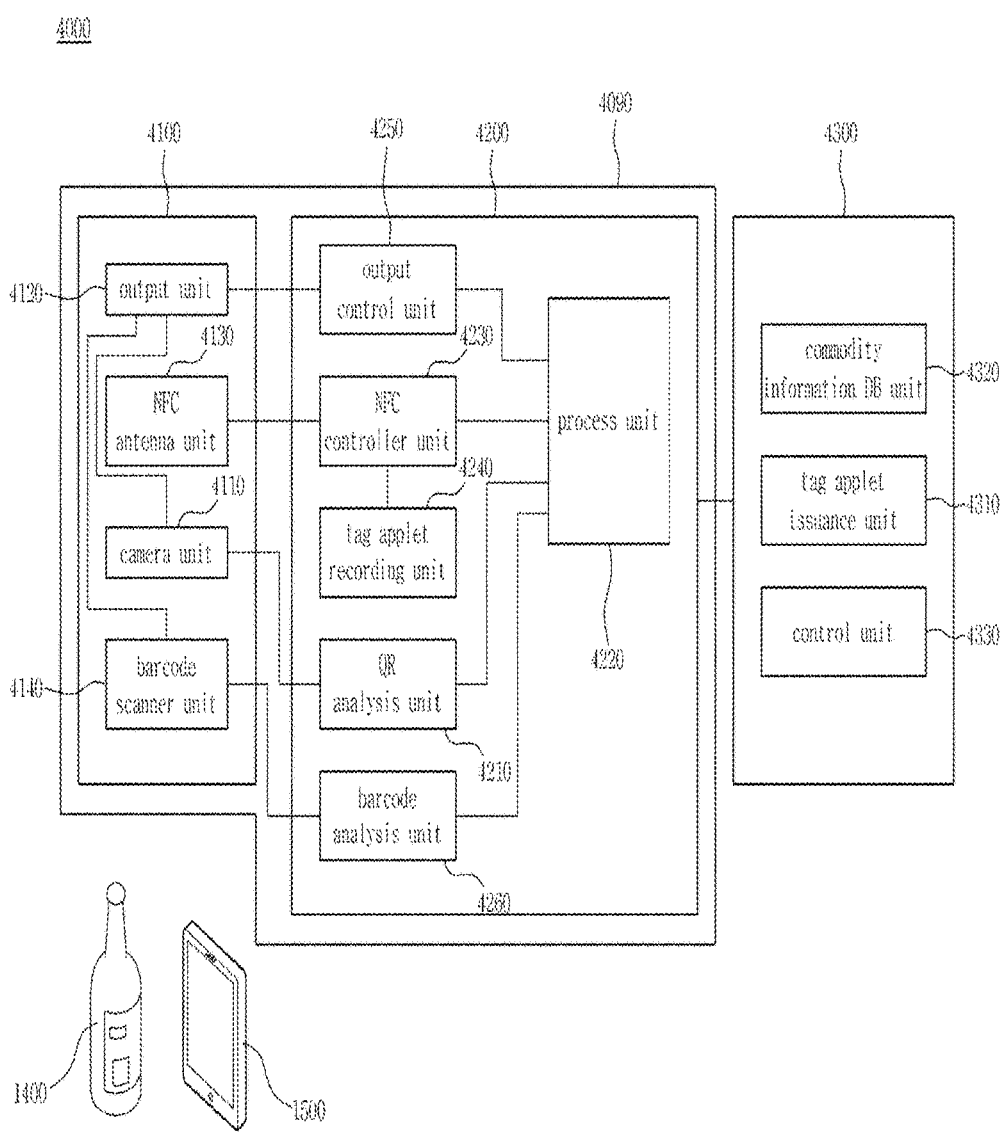
FIG. 13 is a functional block diagram illustrating the configuration of a commodity information provision system according to an eighth embodiment of the present invention.

FIG. 13 is a functional block diagram illustrating the configuration of a commodity information provision system 4000 according to a eighth embodiment of the present invention.

Referring to FIG. 13, the commodity information provision system 4000 according to the eighth embodiment of the present invention will now be described in detail. The commodity information provision system 4000 according to the eighth embodiment of the present invention includes an apparatus unit 4090 including a panel unit 4100 and an operation unit 4200 and a server unit 4300. The commodity information provision system 4000 according to the eighth embodiment is similar to the commodity information provision system 3000 according to the seventh embodiment.

The apparatus unit 4090 includes the panel unit 4100 and the operation unit 4200, and may be any one selected from among an NFC reader and a mobile terminal, which is the same throughout the following description.

The commodity information provision system 4000 according to the eighth embodiment is different from the commodity information provision system 3000 according to the seventh embodiment in that the panel unit 4100 further includes a barcode scanner unit 4140 and the operation unit 4200 further includes a barcode analysis unit 4260. Since the commodity information provision system 4000 according to the eighth embodiment is the same as the commodity information provision system 3000 according to the seventh embodiment except for reference numerals, redundant descriptions will be omitted and only necessary descriptions will be given.

The camera unit 4110 captures a QR code and applies the captured image to both the output unit 4120 and the QR analysis unit 4210, and the barcode scanner unit 4140 scans a barcode and applies the scanned image to both the output unit 4120 and the barcode analysis unit 4260.

The barcode and the QR code are the same in the type and content of information to be recorded, and are different in the amount of information which can be recorded therein, as described above.

The configuration according to the eighth embodiment of the present invention has the advantage of converting commodity information, recorded in optical codes including a QR code and a barcode represented on the surface of a commodity, and commodity information, found using link information, into a tag applet and outputting the tag applet via the NFC mobile terminal.

Figure 14:
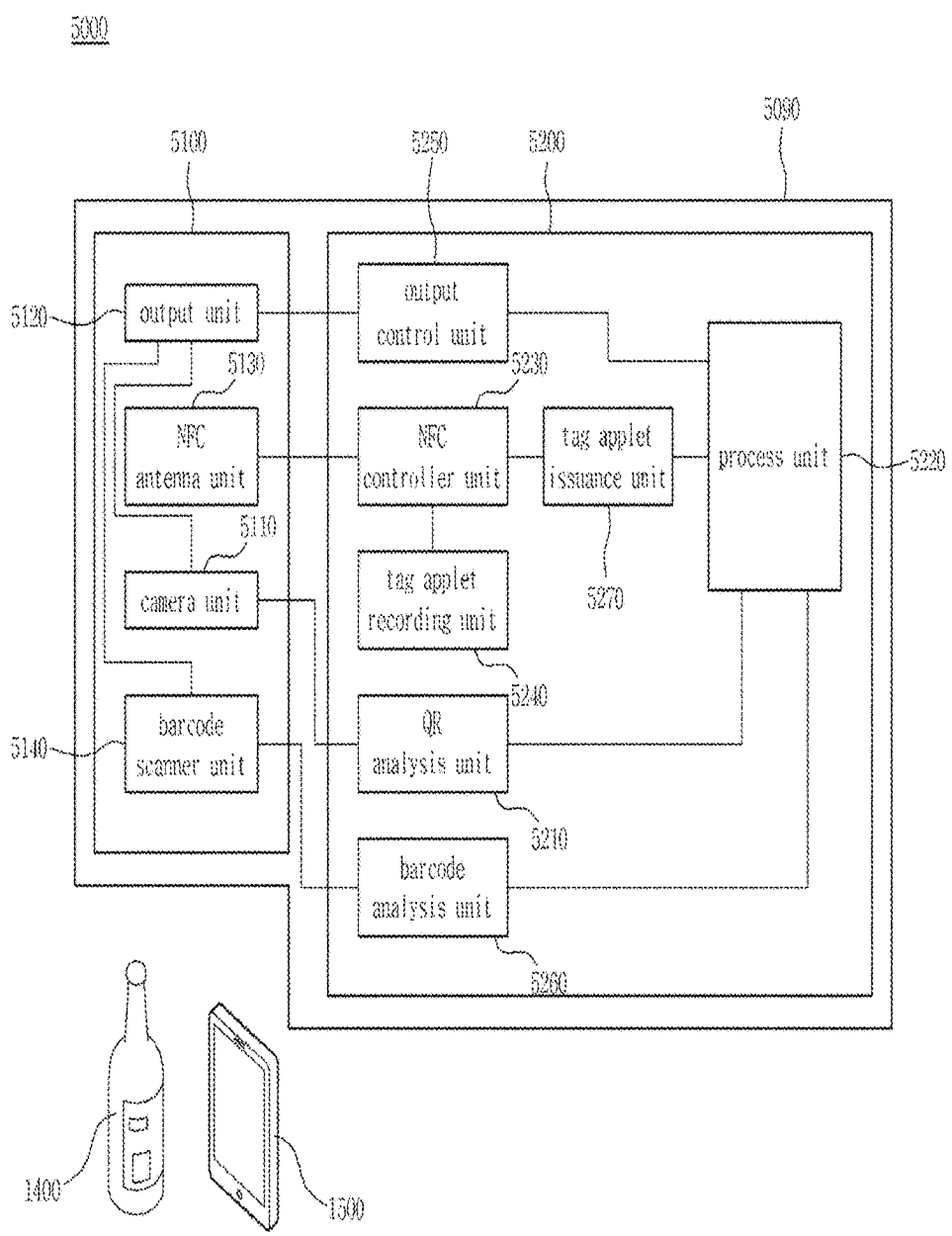
FIG. 14 is a functional block diagram illustrating the configuration of a commodity information provision system according to a ninth embodiment of the present invention.

FIG. 14 is a functional block diagram illustrating the configuration of a commodity information provision system 5000 according to a ninth embodiment of the present invention.

Referring FIG. 14, the commodity information provision system 5000 according to the ninth embodiment of the present invention will now be described in detail. The commodity information provision system 5000 according to the ninth embodiment of the present invention includes an apparatus unit 5090 including a panel unit 5100 and an operation unit 5200. The commodity information provision system 5000 according to the ninth embodiment is partially the same as the commodity information provision system 4000 according to the eighth embodiment.

The apparatus unit 5090 includes the panel unit 5100 and the operation unit 5200, and may be any one selected from among an NFC reader and a mobile terminal, which is the same throughout the following description.

Since the panel unit 5100 includes a camera unit 5110, an output unit 5120, an NFC antenna unit 5130 and a barcode scanner unit 5140 and is the same as the panel unit 4100 of the eighth embodiment except for reference numerals, a redundant description thereof will be omitted here.

The operation unit 5200 includes a QR analysis unit 5210, a process unit 5220, an NFC controller unit 5230, a tag applet recording unit 5240, an output control unit 5250, a barcode analysis unit 5260, and a tag applet issuance unit 5270.

The configuration of the operation unit 5200 according to the ninth embodiment is different from that of the operation unit 4200 according to the eighth embodiment in that the operation unit 5200 further includes a tag applet issuance unit 5270 and the process unit 5220 is not connected to a server unit.

That is, in the ninth embodiment, a server unit is not provided and instead the functionality of the server unit is performed by the tag applet issuance unit 5270 of the operation unit 5200, so that the additional functionality of the process unit 5220 and the additionally provided tag applet issuance unit 5270 will now be described chiefly.

The process unit 5220 recognizes a QR code captured by the QR analysis unit 5210, and receives analyzed commodity data.

Furthermore, the process unit 5220 recognizes a barcode scanned by the barcode analysis unit 5260, and receives analyzed commodity data.

The process unit 5220 transfers commodity information, received from the QR analysis unit 5210 and the barcode analysis unit 5260, to the tag applet issuance unit 5270.

The commodity information according to the ninth embodiment is information that an optical code can include therein, and includes one or more of the advertisement, manufacturer, vendor, release date, expiration date, price information, serial number, name and contact information of a corresponding commodity 1400. That is, since the commodity information according to the ninth embodiment does not include image information and link information, the amount of information which can be provided may be relatively small.

The tag applet issuance unit 5270 converts the commodity data, applied by the process unit 5220, into a tag applet, and applies the tag applet to both the NFC controller unit 5230 and the process unit 5220.

The NFC controller unit 5230 records the applied tag applet in the assigned area of the tag applet recording unit 5240, and provides the applied tag applet if it is determined that the NFC mobile terminal 1500 has tagged the NFC antenna unit 5130.

The process unit 5220 provides the tag applet, applied by the tag applet issuance unit 5270, to the output control unit 5250, thereby allowing the tag applet to be output via the output unit 5120.

The configuration according to the ninth embodiment of the present invention has the advantages of converting commodity information, recorded in optical codes including a QR code and a barcode represented on the surface of a commodity, into a tag applet in the operation unit itself, outputting the tag applet via the output unit in the form of content and wirelessly providing the tag applet to the NFC mobile terminal to be output.

Figure 15:
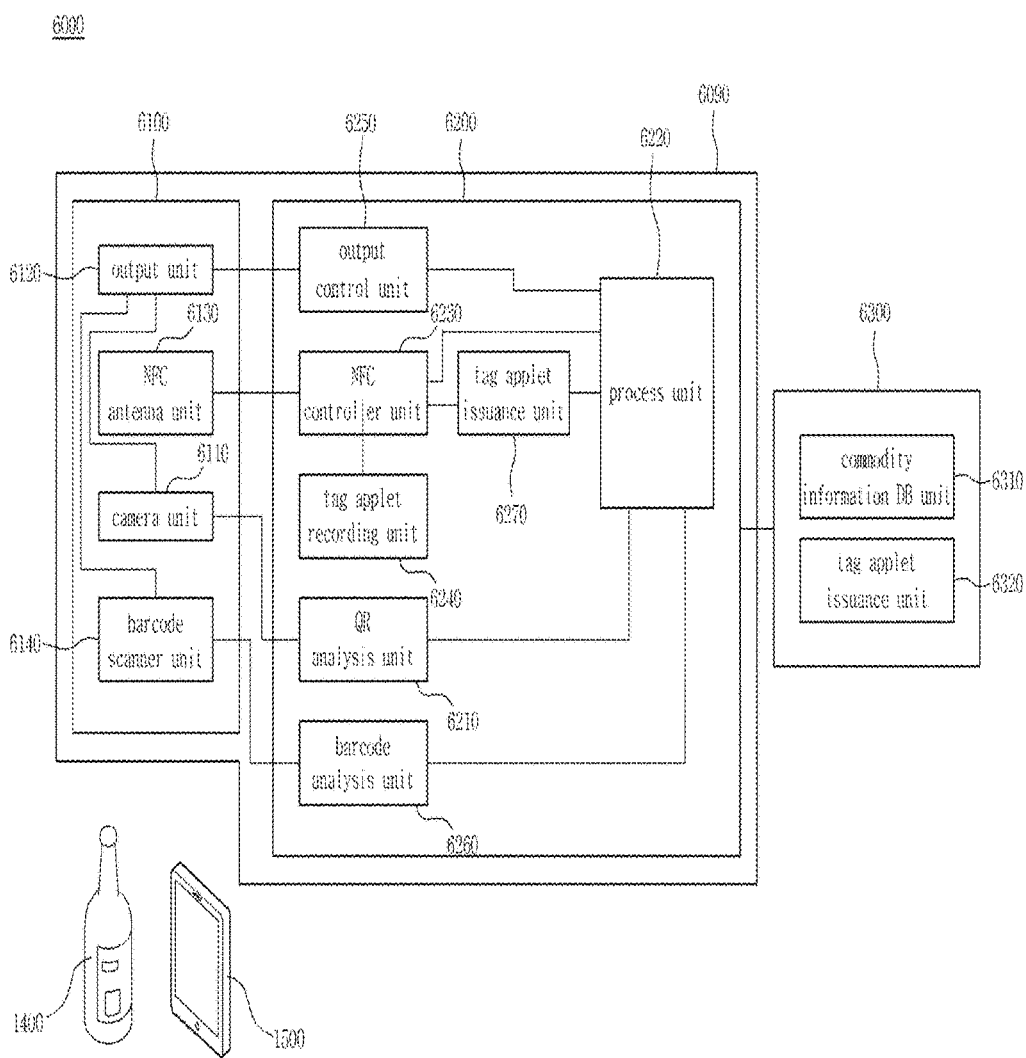
FIG. 15 is a functional block diagram illustrating the configuration of a commodity information provision system according to a tenth embodiment of the present invention.

FIG. 15 is a functional block diagram illustrating the configuration of a commodity information provision system 6000 according to a tenth embodiment of the present invention.

Referring to FIG. 15, the commodity information provision system 6000 according to the tenth embodiment of the present invention will now be described in detail. The commodity information provision system 6000 according to the tenth embodiment of the present invention includes an apparatus unit 6090 including a panel unit 6100 and an operation unit 6200 and a server unit 6300, and is partially the same as the commodity information provision system 5000 according to the ninth embodiment.

The apparatus unit 6090 includes the panel unit 6100 and the operation unit 6200, and may be any one selected from among an NFC reader and a mobile terminal, which is the same throughout the following description.

Since the panel unit 6100 includes a camera unit 6110, an output unit 6120, an NFC antenna unit 6130 and a barcode scanner unit 6140 and is the same in configuration as the panel unit 5100 of the ninth embodiment, a redundant description thereof will be omitted and only descriptions necessary to describe the tenth embodiment will be given.

The operation unit 6200 includes a QR analysis unit 6210, a process unit 6220, an NFC controller unit 6230, a tag applet recording unit 6240, an output control unit 6250, a barcode analysis unit 6260, and a tag applet issuance unit 6270.

The server unit 6300 includes a commodity information DB unit 6310 and a tag applet issuance unit 6320, the commodity information DB unit 6310 records a variety of commodity information linked using link information, and the tag applet issuance unit 6320 converts commodity information into a tag applet.

Since the configuration of the operation unit 6200 of the tenth embodiment is different from the configuration of the operation unit 5200 of the ninth embodiment in that the process unit 6220 directly connects to the NFC controller unit 6230 or connects to the NFC controller unit 6230 via the tag applet issuance unit 6270, different and necessary descriptions will be given chiefly.

The process unit 6220 checks whether link information has been included in the commodity data applied by the QR analysis unit 6210 by analyzing the commodity data.

Here, the process unit 6220 checks whether link information is included in the commodity data provided by the barcode analysis unit by analyzing the commodity data.

It will be apparent that link information may be also included in a barcode.

The process unit 6220 analyzes commodity data applied by the QR analysis unit 6210 or barcode analysis unit 6260, separates link information if the link information has been included in the commodity data, and applies (transfers) the link information to the server unit 6300.

That is, the process unit 6220 according to the tenth embodiment is different from the process unit 5220 according to the ninth embodiment in that the function of checking whether link information has been included, separating the link information and transferring the link information to the server unit has been added to the function of the process unit 5220 according to the ninth embodiment.

Using a process of connecting to a path corresponding to link information applied by the process unit 6220, the server unit 6300 searches for corresponding commodity information from the commodity information DB unit 6310 and applies the found commodity information to the tag applet issuance unit 6320.

The tag applet issuance unit 6320 converts the found and applied commodity information into a tag applet, and provides the commodity information to the process unit 6220 of the operation unit 6200.

The process unit 6220 directly applies (transfers) the tag applet, applied by the server unit 6300, to both the NFC controller unit 6230 and the output control unit 6250.

Meanwhile, the process unit 6220 performs control so that the commodity information applied by the QR analysis unit 6210 is applied (transferred) to the tag applet issuance unit 6270 and then converted into a tag applet, the tag applet issuance unit 6270 applies (transfers) the tag applet, obtained by converting the commodity information, both the NFC controller unit 6230 and the process unit 6220, and the process unit 6220 applies (transfers) the tag applet to the output control unit 6250.

The NFC controller unit 6230 is different in that it includes the functionality described in conjunction with the ninth embodiment and additionally receives the tag applets from both the tag applet issuance unit 6270 and the process unit 6220. Since the configurations and functionalities of the tag applet recording unit 6240, the output control unit 6250, the QR analysis unit 6210 and the barcode analysis unit 6260 are the same as those of the ninth embodiment, redundant descriptions thereof will be omitted here.

The configuration according to the tenth embodiment of the present invention converts commodity information, recorded on optical codes including a QR code and a barcode represented on the surface of a commodity, into a tag applet using the operation unit itself.

In particular, the configuration according to the tenth embodiment of the present invention has the advantage of additionally providing a variety and abundance of commodity information because the configuration detects link information included in a QR code and a barcode, searches for corresponding commodity information from the server unit, converts the commodity information into a tag applet, and provides the tag applet.

Figure 16:
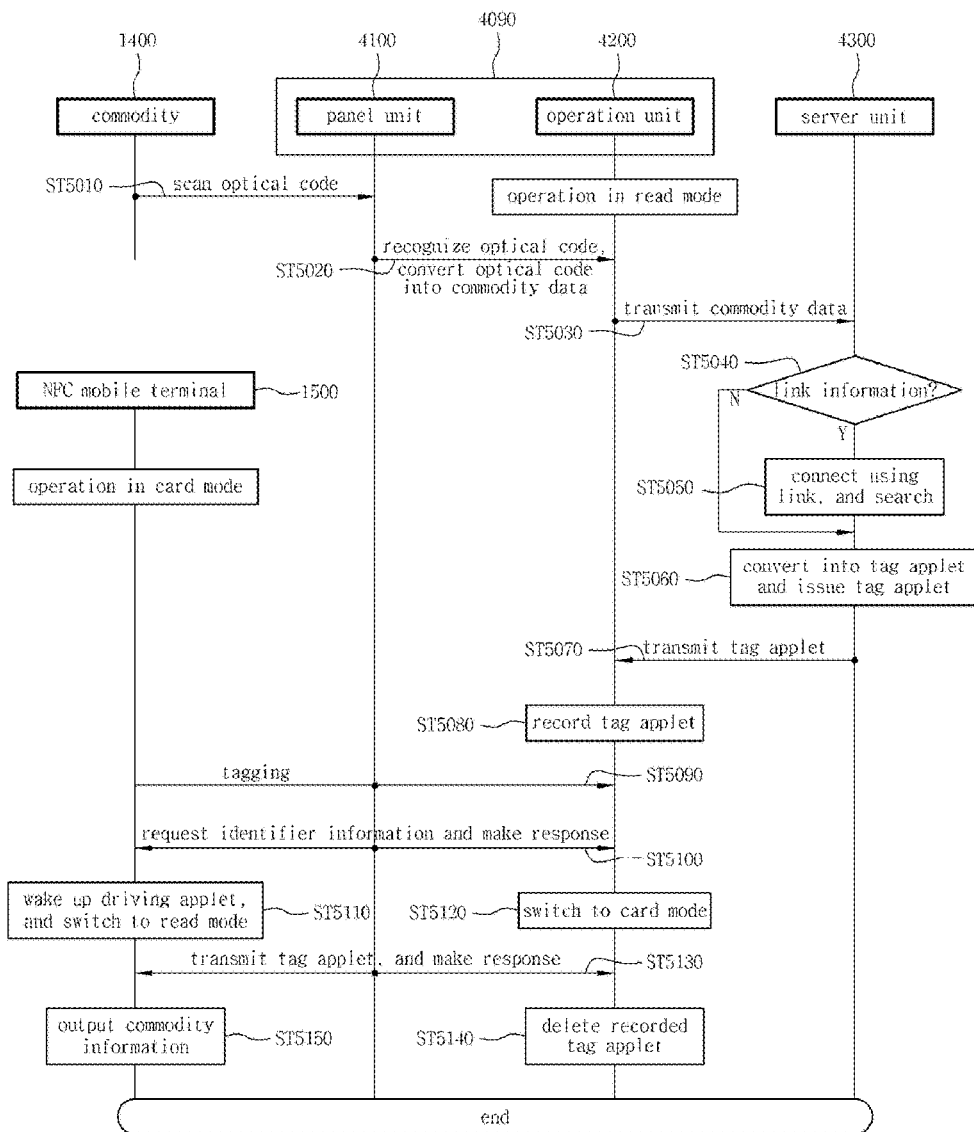
FIG. 16 is a signal flow diagram illustrating the operation of the commodity information provision system according to the fifth embodiment of the present invention.

FIG. 16 is a signal flow diagram illustrating the operation of the commodity information provision system according to the fifth embodiment of the present invention.

Referring to FIG. 16, the operation of the fifth embodiment will now be described in detail based on the configuration of the eighth embodiment.

The NFC mobile terminal 1500 operates in card mode in its initial stage, and the operation unit 4200 operates in read mode in its initial stage.

An optical code of a commodity 1400 is scanned by bringing the optical code close to the panel unit 4100 at step ST5010, the panel unit 4100 transfers the scanned optical code to the operation unit 4200, and the operation unit recognizes the optical code and converts the optical code into commodity data at step ST5020.

The operation unit transmits the obtained commodity data to the server unit at step ST5030, and the server unit checks whether link information has been included in commodity data by analyzing the commodity data at step ST5040, makes a connection using the corresponding link information if the link information has been included, and searches for commodity information at step ST5050.

The server unit converts the commodity data, applied by the operation unit, into a tag applet and issues the tag applet, converts the commodity data and matched commodity information into a tag applet and issues the tag applet if the commodity information has been found using a link at step ST5060, and transmits the tag applet to the operation unit at step ST5070.

The operation unit records the tag applet, transmitted by the server unit, in an assigned area at step ST5080, checks whether the NFC mobile terminal 1500 has performed tagging by monitoring the panel unit, and, if the NFC mobile terminal 1500 has performed tagging at step ST5090, requests the NFC mobile terminal to search for AID information via the panel unit and at the same time requests automatic mode-switching, and receives corresponding results in the form of a response signal at step ST5100.

In this case, the NFC mobile terminal wakes up the driving applet and operates the driving applet in an active state and switches from card mode to read mode at step ST5110, and the operation unit switches from read mode to card mode at step ST5120.

The operation unit which has switched to card mode transmits the recorded tag applet to the NFC mobile terminal via the panel unit using, for example, a frequency in the 13.56 MHz band, and the NFC mobile terminal returns a response signal indicative of reception without error at step ST5130.

If it is determined that the tag applet has been transmitted without error, the operation unit deletes a record of the corresponding tag applet at step ST5140, and the NFC mobile terminal outputs the commodity information by running the received tag applet at step ST5150.

The present invention has the advantage of downloading commodity information to the NFC mobile terminal in the form of content using an optical code including a barcode or a QR code represented on a commodity and conveniently playing back and viewing the commodity information anytime and anywhere.

Figure 17:
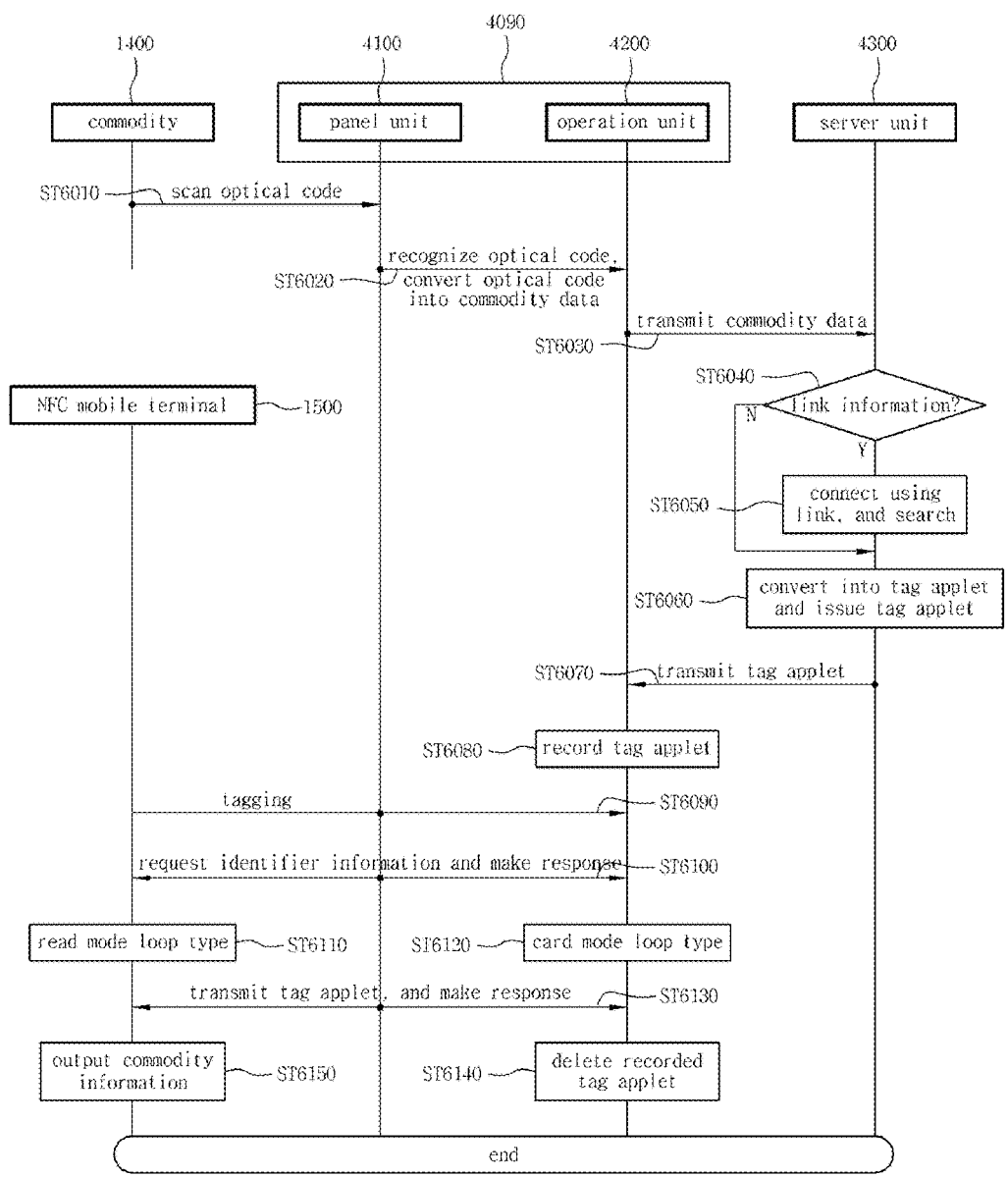
FIG. 17 is a signal flow diagram illustrating the operation of the commodity information provision system according to the sixth embodiment of the present invention.

FIG. 17 is a signal flow diagram illustrating the operation of the commodity information provision system according to the sixth embodiment of the present invention.

Referring to FIG. 17, the operation of the commodity information provision system according to the sixth embodiment of the present invention will now be described based on the configuration of the eighth embodiment.

The operation of the commodity information provision system according to the sixth embodiment of the present invention is different in that the initial operating modes of the NFC mobile terminal 1500 and the operation unit 4200 are not designated and set.

That is, the NFC mobile terminal 1500 and the operation unit 4200 automatically switches between read mode and card mode.

Therefore, the operation of the commodity information provision system according to the sixth embodiment is different from the operation of the commodity information provision system according to the fifth embodiment in that the process of making a mode-switching request and transmitting a corresponding response signal is not required.

Only different descriptions will now be given.

In an initial stage, the NFC mobile terminal 1500 and the operation unit 4200 operate in read mode or card mode, and automatically switch operating mode every period of time which is freely set.

Since steps ST6010 to ST6090 in FIG. 17 are the same as steps ST5010 to ST5090 in the operation of the fifth embodiment, redundant descriptions thereof will be omitted here.

The operation unit 4200 monitors the panel unit 4100, and, if it is determined that the NFC mobile terminal 1500 has performed tagging, requests the NFC mobile terminal to search for AID information and the receives AID information of search results in the form of a response signal at step ST6100.

The NFC mobile terminal wakes up the driving applet and operates the driving applet in an active state, and activates the loop time of read mode and automatically switches to read mode at step ST6110.

The operation unit also activates the loop time of card mode and automatically switches to card mode at step ST6120.

Furthermore, since steps ST6130 to ST6150 in FIG. 17 are the same as steps ST5130 to ST5150 in the operation of the fifth embodiment, redundant descriptions thereof will be omitted here.

The operation of the sixth embodiment has the advantage of the step of processing signals being simplified because the NFC mobile terminal 1500 and the operation unit 4200 do not exchange signals for mode-switching, thereby increasing processing speed.

Figure 18:
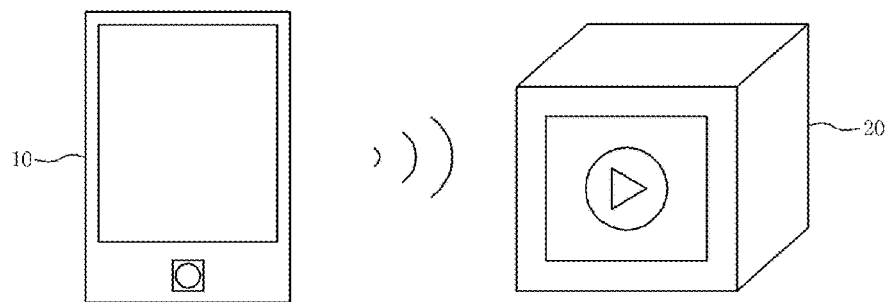
FIG. 18 is a diagram illustrating an NFC tag generation device and a mobile terminal according to an embodiment of the present invention.
Figure 19:
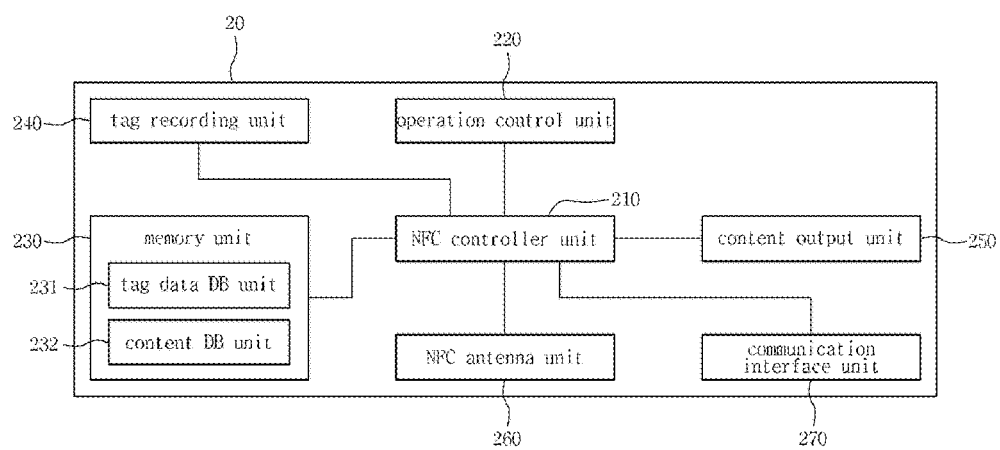
FIG. 19 is a diagram showing the configuration of an NFC tag generation device according to an embodiment of the present invention.

FIG. 18 is a diagram illustrating an NFC tag generation device 20 and a mobile terminal 10 according to an embodiment of the present invention, and FIG. 19 is a diagram showing the configuration of an NFC tag generation device 20 according to an embodiment of the present invention.

Referring to FIG. 18, the NFC tag generation device 20 according to the embodiment of the present invention outputs content including a still image(s), a moving image(s) and/or music to the outside, and plays back the content.

A user may bring the NFC communication-enabled NFC terminal 10 close to the NFC tag generation device 20, and receive content including a still image(s), a moving image(s) or music in the form of tag data.

Referring to FIG. 19, the NFC tag generation device 20 for outputting content to the outside and transmitting tag data to the NFC terminal 10 includes an NFC controller unit 210, an operation control unit 220, a memory unit 230, a tag recording unit 240, a content output unit 250, an NFC antenna unit 260, and a communication interface unit 270.

The NFC tag generation device 20 may output one or more pieces of content via the content output unit 250.

The content may include a medium (media) which can be played back, such as a still image(s), such as a photo(s), a moving image(s) or music.

The content output unit 250 may receive a selection of content using the user's manipulation or predetermined default setting.

For example, when the content output unit 250 is provided with a touch screen and one or more pieces of content are alternately output at regular intervals, the user may transfer a command to select content to be transmitted to the NFC terminal 10 in such a way as to touch the touch screen.

According to an embodiment of the present invention, when the user does not directly transmit a selection command to the content output unit 250 but brings the NFC terminal 10 close to the NFC tag generation device 20, the tag generation device 20 detects a signal from the NFC terminal 10.

Accordingly, specific content may be selected by predetermined default setting without requiring a content selection command via the content output unit 250.

The operation control unit 220 may search for tag data corresponding to content selected via the content output unit 250.

There are tag data which corresponds to each of one or more pieces of content which are output to the outside via the content output unit 250.

Once the content has been selected via the content output unit 250, the operation control unit 220 may detect a selected command signal and search for tag data corresponding to the content.

The NFC controller unit 210 may select transmission mode corresponding to the content selected by the content output unit 250.

The operation control unit 220 transmits a control signal requesting switching to transmission mode corresponding to the selected content to the NFC controller unit 210.

Methods of transmitting data using NFC communication may be classified into card mode, P2P mode, and RW mode. The transmission method may vary with mode depending on the type of content, or all transmission methods may be used.

According to an embodiment of the present invention, it is possible to use a method in which mode-switching stops in corresponding transmission mode when a transmission method corresponding to content is determined in a mode polling state where card mode, P2P mode and RW mode are alternating.

The memory unit 230 may store content to be output to the outside and tag data corresponding to the content.

The memory unit 230 may store content-related data and tag data in its tag data DB unit and content DB unit, which may be constructed in the form of separate storage spaces.

The tag recording unit 240 may include one or more tag recording units, and may temporarily record the tag data of the NFC tag generation device 20 to be transmitted to the outside.

The tag recording unit 240 may be included in one or more selected from among the NFC controller unit 210, the operation control unit 220, and the memory unit 230.

In order to transmit tag data, corresponding to content selected by the user, to the NFC terminal 10, the operation control unit 220 may transfer a control signal, recording the corresponding tag data in the tag recording unit 240, to the NFC controller unit 210.

The NFC antenna unit 260 may transmit tag data to the NFC communication-enabled NFC terminal 10 using an NFC communication method.

When the user brings the NFC terminal 10 close to the NFC tag generation device 20 in order to receive selected content, the NFC tag generation device 20 transmits corresponding tag data via the NFC antenna unit 260 in preset transmission mode.

The communication interface unit 270 may update information about content or tag data, stored in the memory unit 230, with information about new content or tag data.

For this purpose, the communication interface unit 270 may communicate with another content or tag data provision server.

The communication interface unit 270 may include a communication device which performs the functionality of a mobile communication terminal and can connect to a mobile communication network.

Figure 20:
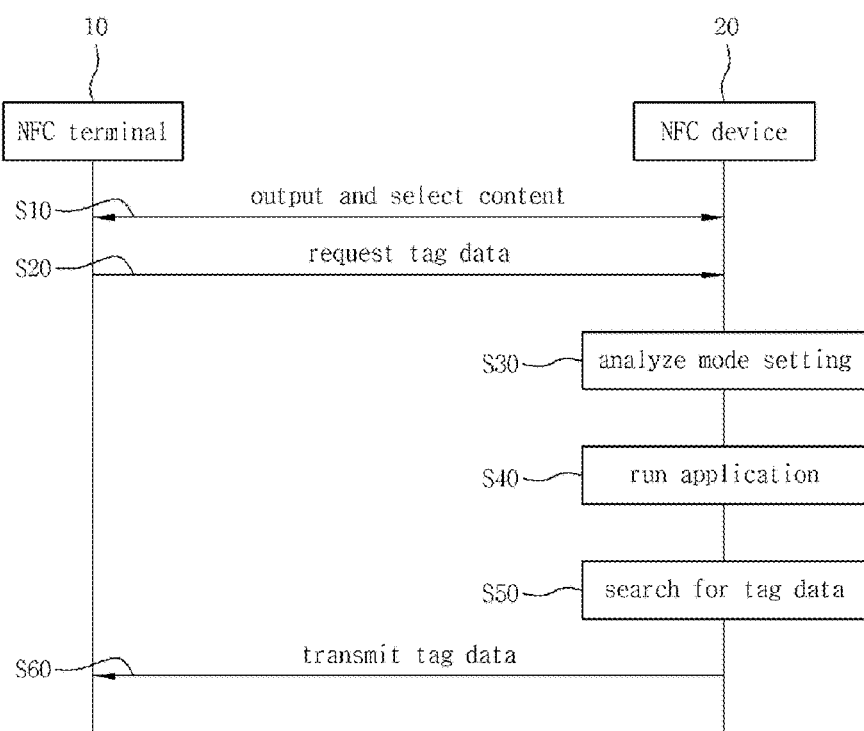
FIG. 20 is a flowchart illustrating an NFC tag transmission method according to an embodiment of the present invention.

FIG. 20 is a flowchart illustrating an NFC tag transmission method according to an embodiment of the present invention.

At step S10, the NFC tag generation device 20 outputs content to the outside, and receives a selection of content from a user.

The NFC generation device 20 may output one or more pieces of content to the outside, and the user may select content to be received.

At step S20, the user requests tag data from the NFC tag generation device 20.

When the user selects desired content at step S10, a signal requesting tag data is automatically transmitted from the NFC tag generation device 20.

At step S30, the setting of transmission mode corresponding to the content selected at step S10 is analyzed.

Methods of transmitting data using NFC communication may be classified into card mode, P2P mode, and RW mode. The transmission method may vary with mode depending on the type of content, or all transmission methods may be used.

It is possible to use a method in which mode-switching stops in corresponding transmission mode when a transmission method corresponding to content is determined in a mode polling state where card mode, P2P mode and RW mode are alternating.

At step S40, an application based on the transmission mode analyzed and determined at step S30 is run.

At step S50, tag data corresponding to the selected content is searched for.

At step S60, when the user brings the NFC terminal 10 close to the NFC tag generation device 20 in order to receive selected content, the NFC tag generation device 20 transmits corresponding tag data in the transmission mode set at step S30.

Meanwhile, when the tag NFC terminal 10 is caused to tag the NFC tag generation device 20 without inputting a command to select content to the NFC tag generation device 20 at step S10, predetermined tag data may be transmitted to the NFC terminal 10 in predetermined transmission mode.

That is, when the NFC tag generation device 20 detects a signal for NFC communication because the NFC terminal 10 comes close to the NFC tag generation device 20, content may be selected using a predetermined method.

According to an embodiment of the present invention, when the tag NFC terminal 10 is caused to tag the NFC tag generation device 20 without inputting a command to select content to the NFC tag generation device 20 at step S10, content at the time when the tagging is performed may be selected, and tag data corresponding to the content may be transmitted to the NFC terminal 10.

Figure 21:
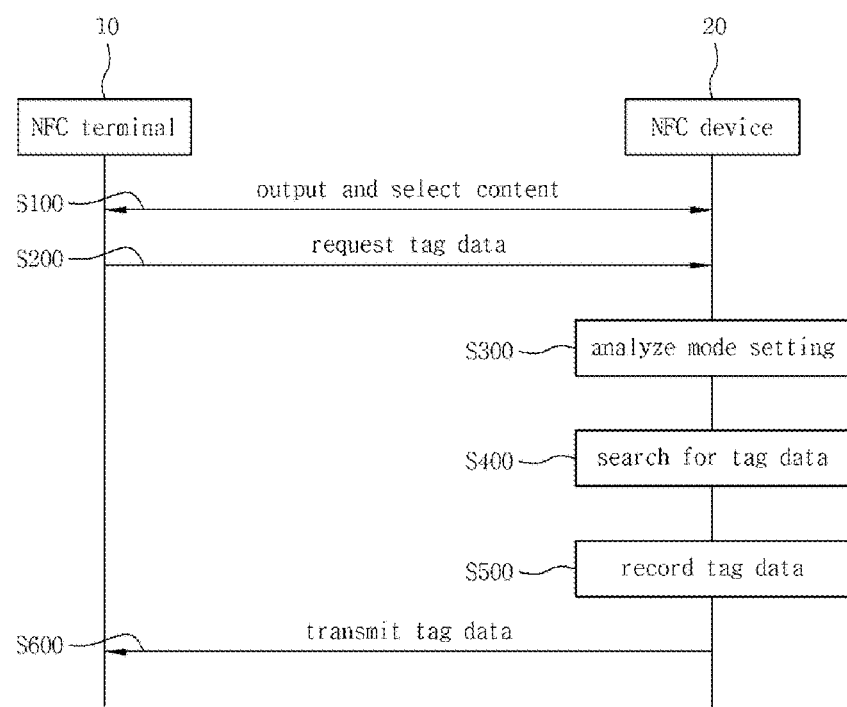
FIG. 21 is a flowchart illustrating an NFC tag transmission method according to an embodiment of the present invention.

FIG. 21 is a flowchart illustrating an NFC tag transmission method according to an embodiment of the present invention.

Since steps S100 to S300 are the same as steps S10 to S30 of FIG. 3, detailed descriptions thereof will be omitted here.

At step S400, tag data corresponding to selected content is searched for.

At step S500, the tag data found at step S400 is recorded in a separate storage space.

At step S600, when the NFC terminal 10 is brought close to the NFC tag generation device 20 in order to receive the content selected by the user, the NFC tag generation device 20 transmits the tag data, stored in the separate storage space, to the NFC terminal 10 in the transmission mode set at step S30.

Meanwhile, when the tag NFC terminal 10 is caused to tag the NFC tag generation device 20 without inputting a command to select content to the NFC tag generation device 20 at step S100, predetermined tag data may be transmitted to the NFC terminal 10 in predetermined transmission mode.

That is, when the NFC tag generation device 20 detects a signal for NFC communication because the NFC terminal 10 comes close to the NFC tag generation device 20, content may be selected using a predetermined method.

According to an embodiment of the present invention, when the tag NFC terminal 10 is caused to tag the NFC tag generation device 20 without inputting a command to select content to the NFC tag generation device 20 at step S100, content at the time when the tagging is performed may be selected, and tag data corresponding to the content may be transmitted to the NFC terminal 10.

The embodiments of the present invention configured as described above has the advantage of repeatedly viewing the content of an advertisement and analyzing it over time when a user is far away from an advertisement medium because the content of the advertisement can be provided and recorded in the form of data by allowing a mobile terminal to tag an advertisement output medium.

Furthermore, the embodiments of the present invention has the advantage of outputting a variety of types of advertisements as corresponding multimedia information and providing them in the form of data using a single output medium.

Meanwhile, the embodiments of the present invention has the advantage of conveniently providing a variety of types of advertisement information using QR codes or barcodes.

Furthermore, the embodiments of the present invention has the advantage of recognizing an optical code including a barcode or a QR code represented on a commodity, converting commodity information, included in the optical code, into an NFC tag applet and providing the NFC tag applet to an NFC mobile terminal, thereby enabling a user to rapidly check accurate commodity information and to purchase optimum commodities because the present invention can.

Furthermore, the embodiments of the present invention has the advantage of receiving and recording content in the form of tag data using the tagging of a content output medium by a mobile terminal and allowing a user to repeatedly review the content when the user is far away from a content medium and to analyze the content over time.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An NFC-enabled apparatus comprising:
    a digital information display;
    a camera;
    at least one memory storing a plurality of selectable pieces of information and a plurality of tag data; and
    a near field communication (NFC) module comprising an NFC antenna and an NFC controller,
    wherein the NFC-enabled apparatus is configured:
        to capture an image using the camera,
        to process the camera-captured image to obtain data relating to the camera-captured image,
        to send, to at least one server, the data relating to the camera-captured image,
        to receive, from the at least one server, a first tag datum corresponding to the data relating to the camera-captured image, and
        to store the first tag datum in the at least one memory as part of the plurality of tag data,
    wherein the NFC-enabled apparatus is configured to display two or more selectable pieces of information among the plurality of selectable pieces of information on the digital information display,
    wherein the NFC-enabled apparatus has a default setting for selecting a predetermined one of the plurality of selectable pieces of information in the absence of a user selection of one of the plurality of selectable pieces of information,
    wherein, in response to a tagging between the NFC-enabled apparatus and a first external NFC-enabled terminal and without a user selection of one of the plurality of selectable pieces of information, the NFC-enabled apparatus is configured to cause a transfer of a tag datum among the plurality of tag data corresponding to the predetermined selectable piece of information from the NFC module to the first external NFC-enabled terminal via an NFC communication channel established between the NFC-enabled apparatus and the first external NFC-enabled terminal,
    wherein the tag datum corresponding to the predetermined selectable piece of information comprises the first tag datum that corresponds to the data relating to the camera-captured image.

2. The apparatus of claim 1, wherein each of the plurality of selectable pieces of information corresponds to one of the plurality of tag data.

3. The apparatus of claim 1, wherein the first tag datum is configured to cause the first external NFC-enabled terminal to communicate with the at least one server using the first tag datum for receiving additional data related to the first tag datum.

4. The apparatus of claim 1,
    wherein, the NFC-enabled apparatus receives a user selection of one of the plurality of selectable pieces of information that is other than the predetermined selectable piece of information, the NFC-enabled apparatus is configured:
    to display on the digital information display an image corresponding to the user-selected one of the plurality of selectable pieces of information, and
    to make a tag datum corresponding to the selected one of the plurality of selectable pieces of information available at the NFC module for NFC communication such that the tag datum is transferred to an external NFC-enabled terminal when an NFC tagging is made between the NFC-enabled apparatus and the external NFC-enabled terminal, wherein the tag datum corresponding to the selected one of the plurality of selectable pieces of information comprises one of the plurality of tag data and does not comprise the first tag datum.

5. The apparatus of claim 1, wherein each of the plurality of selectable pieces of information corresponds to an image for displaying on the digital information display, wherein the NFC-enabled apparatus is configured to display the image on the digital information display in response to selection of said each selectable piece of information.

6. The apparatus of claim 1, wherein the NFC-enabled apparatus is configured to display a first image corresponding to the predetermined selectable piece of information on the digital information display while the first tag datum is available at the NFC module.

7. The apparatus of claim 1, wherein the camera-captured image contains a management number and an expiration date.

8. An NFC-enabled apparatus comprising:
    a digital information display;
    a camera;
    at least one memory storing a plurality of selectable pieces of information and a plurality of tag data; and
    a near field communication (NFC) module comprising an NFC antenna and an NFC controller,
    wherein the NFC-enabled apparatus is configured:
        to capture an image using the camera,
        to process the camera-captured image to obtain data relating to the camera-captured image,
        to send, to at least one server, the data relating to the camera- captured image,
        to receive, from the at least one server, a first tag datum corresponding to the data relating to the camera-captured image, and
        to store the first tag datum in the at least one memory
    wherein the plurality of tag data stored in the at least one memory comprises the first tag datum corresponding to the data relating to the camera-captured image,
    wherein the NFC-enabled apparatus is further configured:
        to display two or more selectable pieces of information among the plurality of selectable pieces of information on the digital information display,
        to receive a user selection of a first selectable piece of information among the two or more selectable pieces of information displayed on the digital information display, and
        to make a tag datum corresponding to the first selectable piece of information available at the NFC module for NFC communication such that the tag datum is transferred to an external NFC-enabled terminal in response to an NFC tagging made between the NFC-enabled apparatus and the external NFC-enabled terminal, wherein the tag datum corresponding to the first selectable piece of information comprises the first tag datum that corresponds to the data relating to the camera-captured image.

9. The apparatus of claim 8, wherein the at least one memory further stores a default setting configured for selecting a predetermined selectable piece of information among the plurality of selectable pieces of information in the absence of a user selection of one of the plurality of selectable pieces of information.

10. The apparatus of claim 8, wherein the first tag datum corresponding to the first selectable piece of information is configured to cause the first external NFC-enabled terminal to communicate with at least one server using the first tag datum for receiving additional data related to the first tag datum.

11. The apparatus of claim 8, wherein the at least one memory further stores a default setting configured for selecting a predetermined selectable piece of information among the plurality of selectable pieces of information in the absence of a user selection of one of the plurality of selectable pieces of information, wherein, when operating in a default mode according to the default setting, in response to a tagging between the NFC-enabled apparatus and a first external NFC-enabled terminal and without a user selection of one of the plurality of selectable pieces of information, the NFC-enabled apparatus is configured to cause a tag datum corresponding to the predetermined selectable piece of information to be transferred from the NFC module of the NFC-enabled apparatus to the first external NFC-enabled terminal.

12. The apparatus of claim 8, wherein the NFC-enabled apparatus is configured to display a first image corresponding to the first selectable piece of information on the digital information display in response to receiving the user selection of first selectable piece of information.

13. A method of operating the NFC-enabled apparatus of claim 8, the method comprising:
detecting an NFC tagging made between the NFC-enabled apparatus and a first external NFC-enabled terminal without involving a selection of one of the plurality of selectable pieces of information displayed on the digital information display; and
subsequent to detecting the NFC tagging, causing the first tag datum to be transferred from the NFC module to the first external NFC-enabled terminal via an NFC communication channel established in response to the NFC tagging between the NFC-enabled apparatus and the first external NFC-enabled terminal.

14. The method of claim 13, further comprising:
displaying two or more selectable pieces of information among the plurality of selectable pieces of information including a first selectable piece of information and a second selectable piece of information on the digital information display;
receiving a user selection of the second selectable piece of information among the two or more selectable pieces of information displayed on the digital information display;
in response to the user selection of the second selectable piece of information, displaying an image corresponding to the second selectable piece of information on the digital information display to confirm the selection of the second selectable piece of information; and
subsequent to the user selection of the second selectable piece of information, making a second tag datum corresponding to the second selectable piece of information available at the NFC module for NFC transmission.

15. The method of claim 13, wherein the at least one memory further stores a default setting configured for selecting a predetermined selectable piece of information among the plurality of selectable pieces of information in the absence of a user selection of one of the plurality of selectable pieces of information.

16. The method of claim 13, wherein the first tag datum corresponding to the data relating to the camera-captured image is configured to cause the first external NFC-enabled terminal to communicate with at least one server using the first tag datum for receiving additional data related to the first tag datum.

17. A method of operating an NFC-enabled apparatus, the method comprising:
providing an NFC-enabled apparatus comprising:
a digital information display,
a camera,
a near field communication (NFC) module comprising an NFC antenna and an NFC controller, and
at least one memory that stores a plurality of selectable pieces of information, wherein the NFC-enabled apparatus is configured to display at least part of the plurality of selectable pieces of information on the digital information display for a user selection,
capturing an image using the camera of the NFC-enabled apparatus;
processing the camera-captured image to obtain data relating to the camera-captured image;
sending the data relating to the camera-captured image to at least one server;
receiving, from the at least one server, a first tag datum corresponding to the data relating to the camera-captured image;
storing the first tag datum in the at least one memory;
subsequently, detecting an NFC tagging made between the NFC-enabled apparatus and a first external NFC-enabled terminal without a user selection of one of the plurality of selectable pieces of information; and
subsequent to detecting the NFC tagging, causing the first tag datum corresponding to the data relating to the camera-captured image to be transferred from the NFC antenna to the first external NFC-enabled terminal via an NFC communication channel established in response to the NFC tagging between the NFC-enabled apparatus and the first external NFC-enabled terminal.

18. The method of claim 17, wherein the at least one memory further stores a default setting for selecting a predetermined one of the plurality of selectable pieces of information in the absence of a user selection of one of the plurality of selectable pieces of information, wherein detecting the NFC tagging without a user selection causes the predetermined selectable piece of information to be selected in accordance with the default setting.

19. The method of claim 17, wherein the at least one memory further stores a plurality of tag data, wherein each of the plurality of selectable pieces of information corresponds to one of the plurality of tag data.

20. The method of claim 17, wherein each of the plurality of selectable pieces of information corresponds to an image for displaying on the digital information display in response to selection of said each selectable piece of information.

21. The method of claim 17, wherein the first tag datum corresponding to the data relating to the camera-captured image is configured to cause the first external NFC-enabled terminal to communicate with at least one server using the first tag datum for receiving additional data related to the first tag datum.

22. The method of claim 17, wherein the at least one memory further stores a default setting for selecting a predetermined one of the plurality of selectable pieces of information,
wherein the first tag datum corresponding to the data relating to the camera-captured image further corresponds to the predetermined one of the plurality of selectable pieces of information.

23. The method of claim 22, wherein the method further comprises receiving acknowledgement of the first external NFC-enabled terminal's receipt of the first tag datum,
wherein the first external NFC-enabled terminal communicates with the at least one server using the first tag datum for receiving additional data related to the first tag datum from the at least one server.

24. The method of claim 22, wherein, subsequent to the NFC tagging between NFC-enabled apparatus and the first external NFC-enabled terminal without a user selection of one of the plurality of selectable pieces of information, the digital information display displays an image corresponding to the predetermined selectable piece of information.

25. The method of claim 22, wherein the camera-captured image contains a management number and an expiration date.

26. The method of claim 17, further comprising:
displaying at least two selectable pieces of information among the plurality of selectable pieces of information including a first selectable piece of information and a second selectable piece of information on the digital information display;
receiving a user selection of the second selectable piece of information among the at least two selectable pieces of information displayed on the digital information display;
in response to the user selection of the second selectable piece of information, displaying an image corresponding to the second selectable piece of information on the digital information display to confirm the selection of the second selectable piece of information; and
subsequent to the user selection of the second selectable piece of information, making a second tag datum corresponding to the second selectable piece of information available at the NFC module for NFC transmission.

27. The method of claim 26, wherein the at least one memory further stores a default setting configured for selecting a predetermined selectable piece of information among the plurality of selectable pieces of information in the absence of a user selection of one of the plurality of selectable pieces of information.

28. The method of claim 17, wherein the at least one memory further stores a default setting for selecting a predetermined one of the plurality of selectable pieces of information in the absence of a user selection of one of the plurality of selectable pieces of information, wherein the first tag datum corresponding to the data relating to the camera-captured image further corresponds to the predetermined one of the plurality of selectable pieces of information, wherein the first tag datum is configured to cause the first external NFC-enabled terminal to communicate with at least one server using the first tag datum for receiving additional data related to the first tag datum.

29. A The method of operating an NFC-enabled apparatus, the method comprising:
providing an NFC-enabled apparatus comprising:
a digital information display,
a camera,
a near field communication (NFC) module comprising an NFC antenna and an NFC controller, and
at least one memory that stores a plurality of selectable pieces of information, wherein the NFC-enabled apparatus is configured to display at least part of the plurality of selectable pieces of information on the digital information display for a user selection,
capturing an image using the camera;
processing the camera-captured image to obtain data relating to the camera- captured image;
sending, to at least one server, the data relating to the camera-captured image;
receiving, from the at least one server, a first tag datum corresponding to the data relating to the camera-captured image;
subsequent to receiving the first tag datum, in response to an NFC tagging between the NFC-enabled apparatus and an external NFC-enabled terminal, causing the first tag datum corresponding to the data relating to the camera-captured image to be transmitted from the NFC module of the NFC-enabled apparatus to the external NFC-enabled terminal;
further subsequent to receiving the first tag datum, displaying, on the digital information display, at least two selectable pieces of information among the plurality of selectable pieces of information including a first selectable piece of information and a second selectable piece of information;
receiving a user selection of the second selectable piece of information among the at least two selectable pieces of information displayed on the digital information display;
in response to the user selection of the second selectable piece of information, displaying an image corresponding to the second selectable piece of information on the digital information display to confirm the selection of the second selectable piece of information; and
subsequent to the user selection of the second selectable piece of information, making a second tag datum corresponding to the second selectable piece of information available at the NFC module for NFC transmission.

30. A system for NFC communication, the system comprising:
the NFC-enabled apparatus of claim 1; and
the external NFC-enabled terminal configured for NFC communication with the NFC-enabled apparatus.

* * * * *